United States Patent
Long

(12) 
(10) Patent No.: US 11,773,984 B1
(45) Date of Patent: Oct. 3, 2023

(54) ELECTRICALLY OPERATED WATER VALVE AND APPLICATION OF ELECTRICALLY OPERATED WATER VALVE ON ELECTRIC APPLIANCE

(71) Applicants: Sanqiao Hui (Foshan) New Materials Co., Ltd., Guangdong (CN); Foshan Gaopeng New Material Partnership (Limited Partnership), Guangdong (CN)

(72) Inventor: Kewen Long, Guangdong (CN)

(73) Assignees: Sanqiao Hui (Foshan) New Materials Co., Ltd.; Foshan Gaopeng New Material Partnership (Limited Partnership)

( * ) Notice: Subject to any disclaimer, the term of this patent is extended or adjusted under 35 U.S.C. 154(b) by 0 days.

(21) Appl. No.: 17/855,778

(22) Filed: Jun. 30, 2022

(30) Foreign Application Priority Data

May 12, 2022 (CN) .......................... 202210518968.8
May 12, 2022 (CN) .......................... 202221156416.9
May 12, 2022 (CN) .......................... 202221159099.6

(51) Int. Cl.
| | |
|---|---|
| *F16K 1/36* | (2006.01) |
| *F16K 27/02* | (2006.01) |
| *F16K 31/08* | (2006.01) |
| *F16K 31/06* | (2006.01) |

(52) U.S. Cl.
CPC .............. *F16K 1/36* (2013.01); *F16K 27/029* (2013.01); *F16K 31/0655* (2013.01); *F16K 31/082* (2013.01)

(58) Field of Classification Search
CPC ...... F16K 1/36; F16K 27/029; F16K 31/0655; F16K 31/082
See application file for complete search history.

(56) References Cited

U.S. PATENT DOCUMENTS

| | | | | |
|---|---|---|---|---|
| 2,972,465 | A * | 2/1961 | Ray | ......................... F16K 31/40 |
| | | | | 251/30.02 |
| 8,500,087 | B2 * | 8/2013 | Cheng | ................... F16K 31/404 |
| | | | | 251/30.05 |
| 10,544,876 | B2 * | 1/2020 | Chen | ................... F16K 31/0672 |

\* cited by examiner

*Primary Examiner* — Eric Keasel

(57) ABSTRACT

A electrically operated water valve includes an outer shell, a lower base, a fixed rack, a permanent magnet, a magnetic core, a coil assembly, sealing silicon and a lower cover plate; the coil assembly is arranged in the outer shell and sleeved on the magnetic core, and the permanent magnet is installed on the fixed rack, which can be movably arranged on the magnetic core; the lower base is installed at a lower end of the outer shell and provided with a water inlet and a water outlet, the lower cover plate is located in the lower base and located at the lower end opening of the outer shell, and the lower cover plate is provided with a water inlet hole and a water outlet hole; the sealing silicon is arranged at a lower end of the fixed rack.

16 Claims, 17 Drawing Sheets

ELECTRICALLY OPERATED WATER VALVE AND APPLICATION OF ELECTRICALLY OPERATED WATER VALVE ON ELECTRIC APPLIANCE

TECHNICAL FIELD

The present disclosure relates to the technical field of an electromagnetic valve, in particular to an electrically operated water valve and an application of the electrically operated water valve on an electric appliance.

BACKGROUND

When a conventional electrically operated water valve is turned on, a coil is powered on, and a movable iron core overcomes elastic force of a spring under the action of electromagnetic force and moves in a direction away from a water inlet, to drive a plugging head to be away from the water inlet. However, when the electrically operated water valve is turned off, the coil is powered off, the movable iron core moves closely to the water inlet under the action of the elastic force of the spring, resulting in the plugging head blocking the water inlet. This type of structure has to be reset using the spring, which is formed by spirally winding a metal strip. A spring is non-directional when delivering force, the elastic force is dispersed, thereby resulting in a poor efficiency in turning on or turning off the electrically operated water valve. When the electrically operated water valve is used, water can easily come into contact with a valve element (movable iron core), the spring, a guide rod and other components. The spring and other metal components is easily rusted. Also foreign matters get stuck in the valve elements, and block the water inlet and a water outlet.

SUMMARY

The purpose of the present disclosure is to provide an electrically operated water valve and an application of the electrically operated water valve on an electric appliance, so as to solve the technical problems of poor turn-on or turn-off efficiency and rusting of internal metal components of the electrically operated water valve in the prior art.

In order to achieve the above purpose, the present disclosure provides an electrically operated water valve, including an outer shell, a lower base, a fixed rack, a permanent magnet, a magnetic core, a coil assembly, sealing silicon and a lower cover plate. The coil assembly is arranged in the outer shell and sleeved on the magnetic core, and the permanent magnet is installed on the fixed rack, which can be movably arranged on the magnetic core. The lower base is installed at a lower end of the outer shell and provided with a water inlet and a water outlet, the lower cover plate is located in the lower base and located at the lower end opening of the outer shell, and the lower cover plate is provided with a water inlet hole and a water outlet hole. The sealing silicon is arranged at a lower end of the fixed rack and located just above the water inlet hole and the water outlet hole, a water inlet chamber and a water outlet chamber which are separated from each other are arranged in the lower base, the water inlet chamber and the water inlet are mutually communicated with the water inlet hole, and the water outlet chamber and the water outlet are mutually communicated with the water outlet hole. Under the action of the coil assembly, the magnetic core and the permanent magnet can repel or attract mutually to drive the fixed rack to ascend or descend, and when the fixed rack moves up and down, the sealing silicon can be driven to open or close the water inlet hole or the water outlet hole.

Preferably, the fixed rack includes a cylinder and a mounting base arranged at one end of the cylinder, and a plug is arranged at one end, away from the mounting base, of the cylinder. An accommodating chamber is arranged on the mounting base, and the permanent magnet is installed in the accommodating chamber. An upper end face of the sealing silicon sinks downwards to form an accommodating groove, and the plug is inserted into the accommodating groove. The cylinder penetrates through the magnetic core so that the permanent magnet and the plug are respectively located above and below the magnetic core. Such structure arrangement of the fixed rack is not only convenient for fixing the permanent magnet, so that the permanent magnet and the fixed rack can move synchronously, but also the movement of the fixed rack can be directly delivered to the plug, so that the effect that the plug drives the sealing silicon to open or close the water outlet hole is better, and less force during the opening or closing process is consumed. The whole structure is more simplified, and the assembly is simpler.

Preferably, a hook is arranged on a side wall of the mounting base to hook the permanent magnet, and two sides, at the hook, of the side wall of the mounting base, are provided with deformation grooves. A bottom surface of the accommodating chamber is provided with a through groove just below the hook. The role of the deformation grooves is to generate certain hook deformation when the permanent magnet is embedded into the accommodating chamber, so as to install the permanent magnet conveniently. After installation, the hook can hook the permanent magnet firmly to avoid hook breakage. The arranged through groove may reduce the separation between the permanent magnet and the magnetic core, so that the magnetic force between the permanent magnet and the magnetic core is greater, and then the electrically operated water valve has a better turn-on or turn-off effect.

Preferably, a limiting strip, protruding outwards, is arranged on the side wall of the mounting base, a limiting groove is arranged on an inner side wall of the outer shell, and the limiting strip may be slidingly embedded into the limiting groove. The limiting strip and the limiting groove may play guiding and limiting roles to the movement of the fixed rack and ensure that the fixed rack moves only in a direction of turning on or turning off the electrically operated water valve, to avoid offset and ensure the turn-on/turn off effect.

Preferably, an upper cover plate is arranged at the upper end opening of the outer shell, the upper cover plate is located just above the fixed rack, and a rubber stopper, which is used to limit the permanent magnet to break away from the accommodating chamber, is arranged on the fixed rack. The upper cover plate may ensure the normal turn-on or turn-off operation of the electrically operated water valve, and improve the structural integrity and closure. The rubber stopper may not only limit the separation of the permanent magnet, but also achieve the buffer action, to prevent the fixed rack from directly striking the upper cover plate, resulting in part damage and falling.

Preferably, the coil assembly includes a skeleton, an electromagnetic coil and a shell. The skeleton is sleeved on the magnetic core, the electromagnetic coil is wound on the skeleton and electrically connected to an external power supply; and the shell is installed on the skeleton and arranged around outside of the electromagnetic coil. Through holes, through which the electromagnetic coil can pass, are formed in the shell and the outer shell. A locating bulge is arranged on the skeleton, a locating groove is formed in the shell, and the locating bulge is buckled in the locating groove. Such structure arrangement of the coil assembly can be convenient for assembly, and the structure is simple.

Preferably, the accommodating groove includes a tightening opening and an accommodating slot that are successively arranged up and down and mutually communicated. A width W1 of the tightening opening is less than a width W2 of the accommodating slot, a width W3 of the plug is greater than the width W1 of the tightening opening, and the plug is embedded into the accommodating slot through the tightening opening. After being located in the accommodating slot, the plug is not easy to break out of the accommodating slot due to the limitation of the tightening opening, therefore the fixed rack continuously moves up and down to keep the connection with the sealing silicon, so as to ensure no mutual falling, resulting in the sealing silicone not blocking the water hole if necessary.

Preferably, a width W4 of a joint of the plug and the cylinder is less than the width W1 of the tightening opening. The plug can be limited well to break out of the accommodating slot, at the same time avoid the deformation of the sealing silicon at the tightening opening for a long time, resulting in deformation failure, and then the tightening opening cannot recover to the initial size, resulting in the plug breaking out of the accommodating slot easily.

Preferably, a ring groove that sinks upwards is formed in a lower end face of the plug, a ring bulge that raises upwards is arranged on a bottom surface of the accommodating slot, and the ring bulge is embedded into the ring groove. By arranging the ring bulge and the ring groove, workers can intuitively perceive whether the assembly is in place during assembly, and at the same time the plug is more stably embedded into the accommodating slot.

Preferably, the lower cover plate is provided with an outer ring and an inner ring, and the outer ring is arranged around outside the inner ring. An outer edge extending outwards is arranged at a lower end opening of the sealing silicon, the outer edge is located between the outer ring and the inner ring, an upper end face of the outer edge resists to a lower end face of the outer shell, and a lower end face of the outer edge resists to an upper end face of the lower cover plate. The lower end face of the outer shell also resists to the upper end face of the outer ring, and an outer wall of the inner ring resists to an inner wall of the sealing silicon. Assembly structures of the cover plate and the sealing silicon are compact, more importantly, avoid water in the sealing silicon outflowing between the outer shell and the sealing silicon (namely, outside the sealing silicon), resulting in rust of the metal components in the electrically operated water valve when the electrically operated water valve is used. Preferably, a height H1 of the inner ring is greater than a height H2 of the outer ring. The height H1 of the inner ring is designed to be higher, so that the water in the sealing silicon is not easy to flow out from a gap between the sealing silicon and the inner ring, to further ensure the airtightness and prevent the rust of the metal components in the electrically operated water valve.

Preferably, the electrically operated water valve further includes a rubber mat arranged below the lower cover plate, and a first convex ring is arranged at an edge of a lower end face of the rubber mat. A second convex ring is arranged at an edge of a lower end face of the lower cover plate, a first neck with an upward opening is arranged on an inner side wall of the lower base, and the first convex ring and the second convex ring are inserted into the first neck. Such arrangement may further improve the connecting stability among the lower cover plate, the rubber mat and the lower base. A side wall, closing to the middle of the lower base, of the first neck resists to the rubber mat, which can further prevent the water from circulating between the water inlet chamber and the water outlet chamber through the gap between the lower cover plate and the lower base.

Preferably, a third convex ring that raises upwards is arranged on the upper end face of the rubber mat, a ring groove that sinks upwards is formed in the lower end face of the lower cover plate, and the third convex ring is buckled in the ring groove. The assembly of the rubber mat and the lower cover plate is convenient, and the rubber mat is closer to the lower cover plate.

Preferably, when moving up and down, the fixed rack may drive the sealing silicon to open or close the water outlet hole. The lower cover plate is provided with a fourth convex ring raised upwards at the water outlet hole, and the fourth convex ring is provided with a notch, which is mutually communicated with the water outlet hole. The structure of the lower cover plate is simpler. When cleaning and dredging the water outlet hole, indicating to clean and dredge the waste water outlet, therefore, the waste water outlet is more convenient to clean and dredge.

Preferably, a first pin is arranged on the plug, passes through the sealing silicon, is inserted into the water outlet hole, and moves axially in relative to the water outlet hole. When turning on or turning off the electrically operated water valve, the automatic cleaning and dredging of the water outlet hole may be achieved by arranging the first pin, instead of cleaning and dredging the water outlet hole separately, and the service life is longer.

Preferably, a spring is sleeved on a side wall of the tightening opening, the spring is located in the sealing silicon, one end of the spring is bended to form a second pin, and the second pin is inserted into the water inlet hole and moves axially in relative to the water inlet hole. When turning on or turning off the electrically operated water valve, the automatic cleaning and dredging of the water inlet hole may be achieved, instead of cleaning and dredging the water inlet hole separately, and the spring is sleeved on the side wall of the tightening opening to prevent the spring from falling off.

On the other hand, the present disclosure further provides an application of the electrically operated water valve on an electric appliance. For the application of the electrically operated water valve on the electric appliance, the electric appliance is any one of a water purifier, a purified water dispenser, a water dispenser, a floor scrubber, a sweeper, a clothes steamer, a dust collector, a washing machine and a dish-washing machine.

The electrically operated water valve and the application of the electrically operated water valve on the electric appliance provided by the present disclosure at least have the following beneficial effects: when the coil assembly is powered on, the magnetic core and permanent magnet repel each other to turn on the electrically operated water valve by arranging the permanent magnet, and when powering off, the permanent magnet and the magnetic core attract each other to turn off the electrically operated water valve. Compared with the spring adopted, the reset of the fixed rack depends on the permanent magnet, so the force delivery is more directional, the effect of turning on or turning off the electrically operated water valve is ensured, the force delivery efficiency is higher, and the vibration among parts is also greatly reduced. With permanent magnetism, even the permanent magnet is used for a long time, the effect of turning on or turning off the electrically operated water valve still keeps stable, and the service life of the electrically operated water valve is prolonged. The permanent magnet, the fixed rack and the sealing silicon are directly connected and synchronously move, therefore when the permanent magnet is subjected to the action of the magnetic core, the water inlet is directly opened or closed. Compared with the existing electrically operated water valve, the quantity of the parts is less, the structure is more simplified, the assembly is simpler, and less force is consumed during a transmission process due to less quantity of the parts. The lower cover plate, the fixed rack, the permanent magnet, the magnetic core and the coil assembly may be separated by arranging the sealing silicon, so that water cannot contact with the fixed rack, the permanent magnet, the magnetic core, the coil assembly and the like when circulating in the water inlet hole and the water outlet hole. Therefore, the rust of the metal components in the electrically operated water valve is avoided, so that the fixed rack is not stuck, and the water inlet hole and the water outlet hole are not blocked.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below merely illustrate some embodiments of the present disclosure. Those ordinarily skilled in the art can obtain other drawings according to the structures of these drawings without creative labor on the basis of those drawings.

Figure 1:
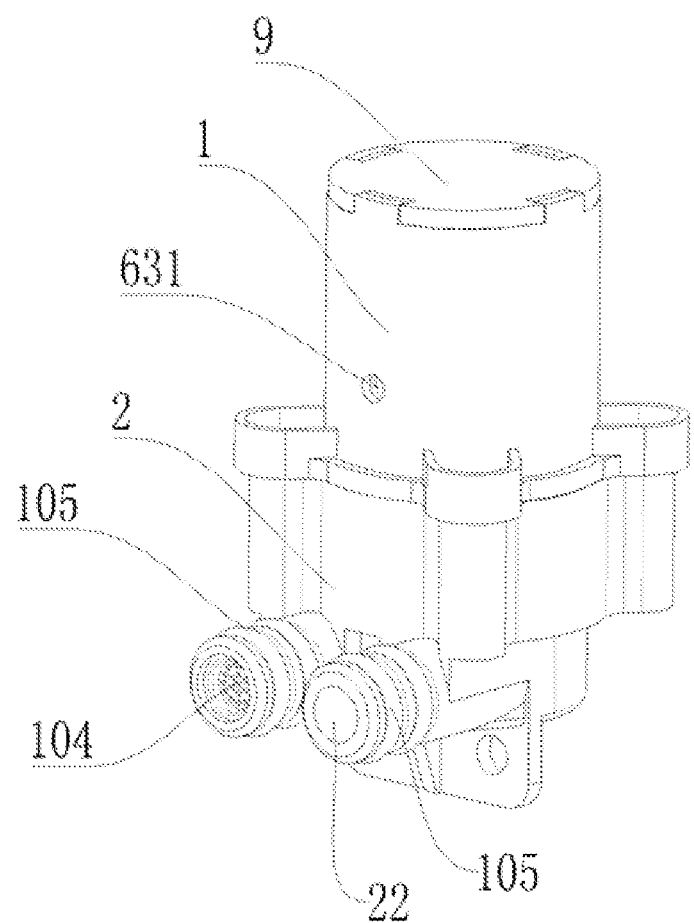
FIG. 1 is a schematic diagram of a solid structure of an electrically operated water valve of the present disclosure.

In the drawings: 1-outer shell, 11-limiting groove, 12-upper partition, 121-slot position, 13-lower partition, 14-buckle, 2-lower base, 21-water inlet, 22-water outlet, 23-water inlet chamber, 24-water outlet chamber, 25-first neck, 3-fixed rack, 31-cylinder, 32-mounting base, 321-accommodating chamber, 322-hook, 3221-guide inclined plane, 323-deformation groove, 324-through groove, 325-limiting strip, 33-plug, 331-ring groove, 4-permanent magnet, 5-magnetic core, 6-coil assembly, 61-skeleton, 611-locating bulge, 62-electromagnetic coil, 63-shell, 631-through hole, 632-locating groove, 7-sealing silicon, 71-accommodating groove, 711-tightening opening, 712-accommodating slot, 72-ring bulge, 73-inclined guide plane, 74-outer edge, 8-lower cover plate, 81-water inlet hole, 82-water outlet hole, 83-outer ring, 84-inner ring, 85-convex circle, 86-second convex ring, 87-ring groove, 88-fourth convex ring, 89-notch, 9-upper cover plate, 91-second neck, 10-rubber stopper, 101-rubber mat, 1011-first convex ring, 1012-third convex ring, 102-first pin, 103-spring, 1031-second pin, 104-filter screen, 105-silicon gasket.

The purpose realization, functional characteristics and advantages of the present disclosure will be further described in combination with the embodiments and with reference to the drawings.

DETAILED DESCRIPTION OF THE EMBODIMENTS

The technical solutions in the embodiments of the present disclosure are clearly and completely elaborated below in combination with the drawings. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

It is to be noted that if directional indication (such as: upper, lower, left, right, front, rear, etc.) is involved in the embodiments of the present disclosure, the directional indication is merely used to explain the relative position relation, movement and the like of various components under a certain special posture (as shown in the drawings); and if the special posture is changed, the directional indication will change accordingly.

In addition, if the descriptions "first" and "second" are involved in the embodiments of the present disclosure, the descriptions "first" and "second" are merely used for description, instead of being understood as indicating or implying relative importance or impliedly indicating the quantity of the showed technical features. Thus, the features defined with "first" and "second" may expressly or impliedly one or more features. In addition, the technical solutions of various embodiments may be mutually combined, but must be achieved by those of ordinary skill in the art. When the combination of the technical solution has mutual contradiction or cannot be achieved, it should believe that such combination of the technical solution does not exist and does not fall in the protection range required by the present disclosure.

As shown in FIG. 1-FIG. 25, an electrically operated water valve includes an outer shell 1, a lower base 2, a fixed rack 3, a permanent magnet 4, a magnetic core 5, a coil assembly 6, sealing silicon 7 and a lower cover plate 8. The coil assembly 6 is arranged in the outer shell 1 and sleeved on the magnetic core 5, and the permanent magnet 4 is installed on the fixed rack 3, which can be movably arranged on the magnetic core 5. The lower base 2 is installed at a lower end of the outer shell 1 and provided with a water inlet 21 and a water outlet 22, the lower cover plate 8 is located in the lower base 2 and located at the lower end opening of the outer shell 1, and the lower cover plate 8 is provided with a water inlet hole 81 and a water outlet hole 82. The sealing silicon 7 is arranged at a lower end of the fixed rack 3 and located just above the water inlet hole 81 and the water outlet hole 82, a water inlet chamber 23 and a water outlet chamber 24 which are separated from each other are arranged in the lower base 2, the water inlet chamber 23 is mutually communicated with the water inlet 21 and the water inlet hole 81, and the water outlet chamber 24 is mutually communicated with the water outlet 22 and the water outlet hole 82. Under the action of the coil assembly 6, the magnetic core 5 and the permanent magnet 4 can repel or attract mutually to drive the fixed rack 3 to ascend or descend, and when the fixed rack 3 moves up and down, the sealing silicon 7 can be driven to open or close the water inlet hole 81 or the water outlet hole 82.

The outer shell 1 is a shell 63 with a hollow interior, and the fixed rack 3, the permanent magnet 4, the magnetic core, the coil assembly 6 and the sealing silicon 7 are arranged in the outer shell 1. The permanent magnet 4 is installed on the fixed rack 3, and the sealing silicon 7 is arranged at a lower end of the fixed rack 3, so the permanent magnet 4, the fixed rack 3 and the sealing silicon 7 move synchronously. The lower base 2 is installed at a lower end of the outer shell 1, specifically screw holes may be formed at the corresponding positions of the lower base 2 and the outer shell 1, a bolt is screwed into the screw holes of the lower base 2 and the outer shell 1 so as to fixedly connect the lower base 2 with the outer shell 1, and a lower end of the outer shell 1 may be also inserted into the lower base 2. The lower cover plate 8 is arranged at the lower end of the outer shell 1 and located in the lower base 2, and the lower cover plate 8 can be fixed after fixing the outer shell 1 and the lower base 2. The water inlet hole 81 and the water outlet hole 82 are formed in the lower cover plate 8, the water inlet chamber 23 and the water outlet chamber 24 are arranged in the lower base 2, and the water inlet chamber 23 and the water outlet chamber 24 are chambers separated from each other. The water inlet 21 and the water outlet 22 are arranged on the lower base 2, the water inlet 21 and the water inlet hole 81 are mutually communicated with the water inlet chamber 23, the water inlet hole 81 is further mutually communicated with a cavity enclosed by the sealing silicon 7 and the lower cove plate 8, the water outlet 22 and the water outlet hole 82 are mutually communicated with the water outlet chamber 24, and the water outlet hole 82 is further mutually communicated with a cavity enclosed by the sealing silicon 7 and the lower cover plate 8. The water flowing direction: water flows into the water inlet chamber 23 from the water inlet 21, and then enters the cavity enclosed by the sealing silicon 7 and the lower cover plate 8 through the water inlet hole 81, then enters the water outlet chamber 24 through the water outlet hole 82, finally is drained through the water outlet 22. In this embodiment, when the fixed rack 3 moves up and down, the sealing silicon 7 can be driven to open or close the water outlet hole 82, so as to achieve the purpose of cutting off the water flow. Certainly, the water inlet hole 81 may be opened or closed in other embodiments. The permanent magnet 4 has magnetism, which is permanent, so as to absorb the magnetic core 5. The magnetic core 5 may be made of iron, and the coil assembly 6 is sleeved on the magnetic core 5 and electrically connected to an external power supply. When the external power supply provides power to the coil assembly 6, the coil assembly 6 generates a magnetic field to magnetize the magnetic core 5, so that the magnetic core 5 has magnetism, and at this time, the magnetic force of the magnetic core 5 is greater than that of the permanent magnet 4. When the external power supply stops providing power to the coil assembly 6, the magnetic field disappears, and the magnetic core 5 has no magnetism.

When the electrically operated water valve is turned on, the external power supply provides power to the coil assembly 6, the coil assembly 6 generates the magnetic field to magnetize the magnetic core 5, and at this time the magnetism of the magnetic core 5 is the same as that of the permanent magnet 4. Due to the principle of polar repulsions, the permanent magnet 4 is away from the magnetic core 5, therefore the permanent magnet 4 drives the fixed rack 3 to be away from the water outlet hole 82. When the fixed rack 3 is away from the water outlet hole 82, the sealing silicon 7 is driven to deform upwards and be away from the water outlet hole 82. At this time, the sealing silicon 7 will not block the water outlet hole 82, the water flow is not cut off, and the electrically operated water valve is in a turn-on state. When the electrically operated water valve is turned off, the external power supply does not provide power to the coil assembly 6, the coil assembly 6 does not generate the magnetic field at this time, and the magnetic core 5 has no magnetism. However, under the effect of the magnetic force of the permanent magnet 4, the magnetic core 5 and the permanent magnet 4 attract each other, so that the permanent magnet 4 and the fixed rack 3 are closed to the water outlet hole 82. When the fixed rack 3 is closed to the water outlet hole 82, the sealing silicon 7 is driven to generate a certain deformation and be closed to the water outlet hole 82 so as to block the water outlet hole 82. At this time, the water flow is cut off, and the electrically operated water valve is in a turn-off state.

When the coil assembly 6 is powered on, the magnetic core 5 and permanent magnet 4 repel each other to turn on the electrically operated water valve by arranging the permanent magnet 4, and when powering off, the permanent magnet 4 and the magnetic core 5 attract each other to turn off the electrically operated water valve. Compared with the spring 103 adopted, the reset of the fixed rack 3 depends on the permanent magnet 4, so the force delivery is more directional, the effect of turning on or turning off the electrically operated water valve is ensured, the force delivery efficiency is higher, and the vibration among parts is also greatly reduced. With permanent magnetism, even the permanent magnet 4 is used for a long time, the effect of turning on or turning off the electrically operated water valve still keeps stable, and the service life of the electrically operated water valve is prolonged. The permanent magnet 4, the fixed rack 3 and the sealing silicon 7 are directly connected and synchronously move, therefore when the permanent magnet 4 is subjected to the action of the magnetic core 5, the water inlet 21 is directly opened or closed. Compared with the existing electrically operated water valve, the quantity of the parts is less, the structure is more simplified, the assembly is simpler, and less force is consumed during a transmission process due to less quantity of the parts. The lower cover plate 8, the fixed rack 3, the permanent magnet 4, the magnetic core 5 and the coil assembly 6 may be separated by arranging the sealing silicon 7, so that water cannot contact with the fixed rack 3, the permanent magnet 4, the magnetic core 5, the coil assembly 6 and the like when circulating in the water inlet hole 81 and the water outlet hole 82. Therefore, the rust of the metal components in the electrically operated water valve is avoided, so that the fixed rack 3 is not stuck, and the water inlet hole 81 and the water outlet hole 82 are not blocked.

Further, as shown in FIG. 10-FIG. 12, FIG. 17 and FIG. 18, the fixed rack 3 includes a cylinder 31 and a mounting base 32 arranged at one end of the cylinder 31, and a plug 33 is arranged at one end, away from the mounting base 32, of the cylinder 31. An accommodating chamber 321 is arranged on the mounting base 32, and the permanent magnet 4 is installed in the accommodating chamber 321. The upper end face of the sealing silicon 7 sinks downwards to form an accommodating groove 71, and the plug 33 is inserted into the accommodating groove 71. The cylinder 31 penetrates through the magnetic core 5 so that the permanent magnet 4 and the plug 33 are respectively located above and below the magnetic core 5.

The cylinder 31, the mounting base 32 and the plug 33 are of integrated structures, the mounting base 32 is located at one end of the cylinder 31, the mounting base 32 and the cylinder 31 are of cylinder 31 structures, and an outer diameter of the mounting base 32 is greater than that of the cylinder 31. An accommodating chamber 321 is arranged on the mounting base 32, the permanent magnet 4 is located in the accommodating chamber 321, the permanent magnet 4 and the accommodating chamber 321 are of ring structures, and a depth of the accommodating chamber 321 is greater than a thickness of the permanent magnet 4. One end of the cylinder 31 is provided with the mounting base 32 while the other end is provided with the plug 33, the upper end face of the sealing silicon 7 sinks downwards in the middle of the sealing silicon 7 to form the accommodating groove 71, and the plug 33 is inserted into the accommodating groove 71 from top to bottom. The magnetic core 5 is a T-shaped structure with opened upper and lower ends and a hollow interior. The cylinder 31 penetrates through the magnetic core 5 and can move up and down along an axial direction in relative to the magnetic core 5, the mounting base 32 and the permanent magnet 4 are located above the magnetic core 5, and the plug 33 is located below the magnetic core 5. Such structure arrangement of the fixed rack 3 is not only convenient for fixing the permanent magnet 4, so that the permanent magnet 4 and the fixed rack 3 can move synchronously, but also the movement of the fixed rack 3 can be directly delivered to the plug 33, so that the effect that the plug 33 drives the sealing silicon 7 to open or close the water outlet hole 82 is better, and the force during the opening or closing process is less. The whole structure is more simplified, and the assembly is simpler. On the other hand, the plug 33 is directly embedded into the accommodating groove 71 of the sealing silicon 7, so that the movement trend of the fixed rack 3 is directly delivered to the sealing silicon 7, the sealing silicon 7 and the fixed rack 3 have better synchronism, and the electrically operated water valve is effectively and timely turned on or turned off. The plug 33 directly resists to the sealing silicon 7, which can generate deformation, therefore the effect that the sealing silicon 7 blocks the water hole is better, and the electrically operated water valve is more thoroughly turned off.

Figure 5:
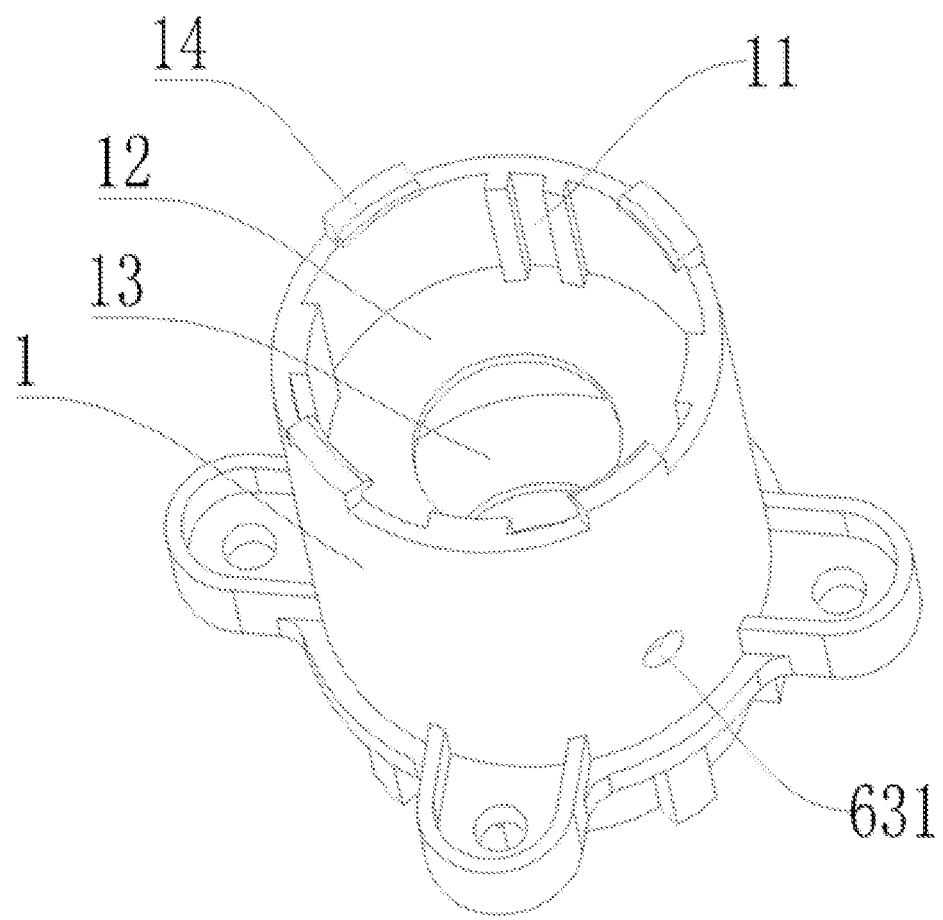
FIG. 5 is a structural schematic diagram of an outer shell of the present disclosure.
Figure 6:
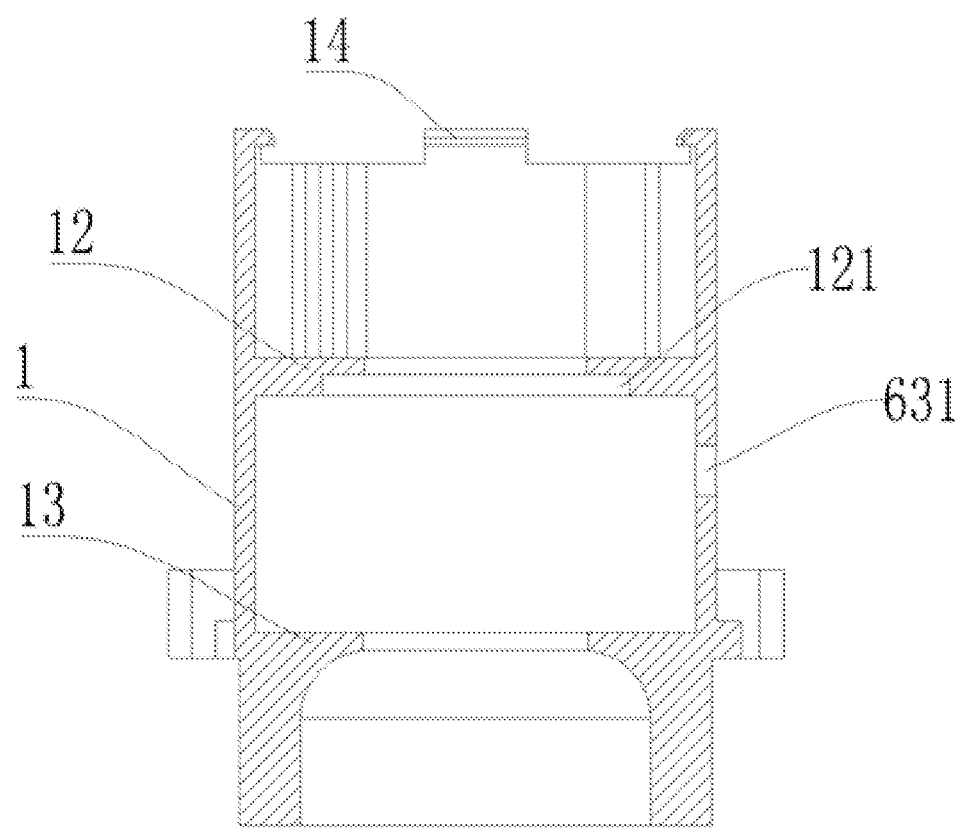
FIG. 6 is a structural schematic diagram of a section of an outer shell of the present disclosure.
Figure 7:
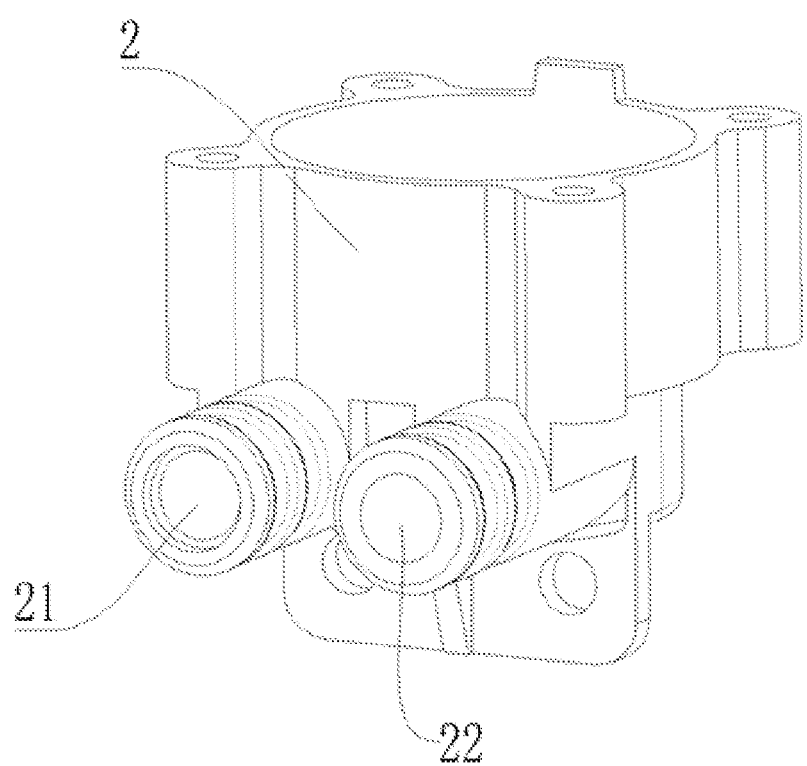
FIG. 7 is a structural schematic diagram of a lower base of the present disclosure.
Figure 8:
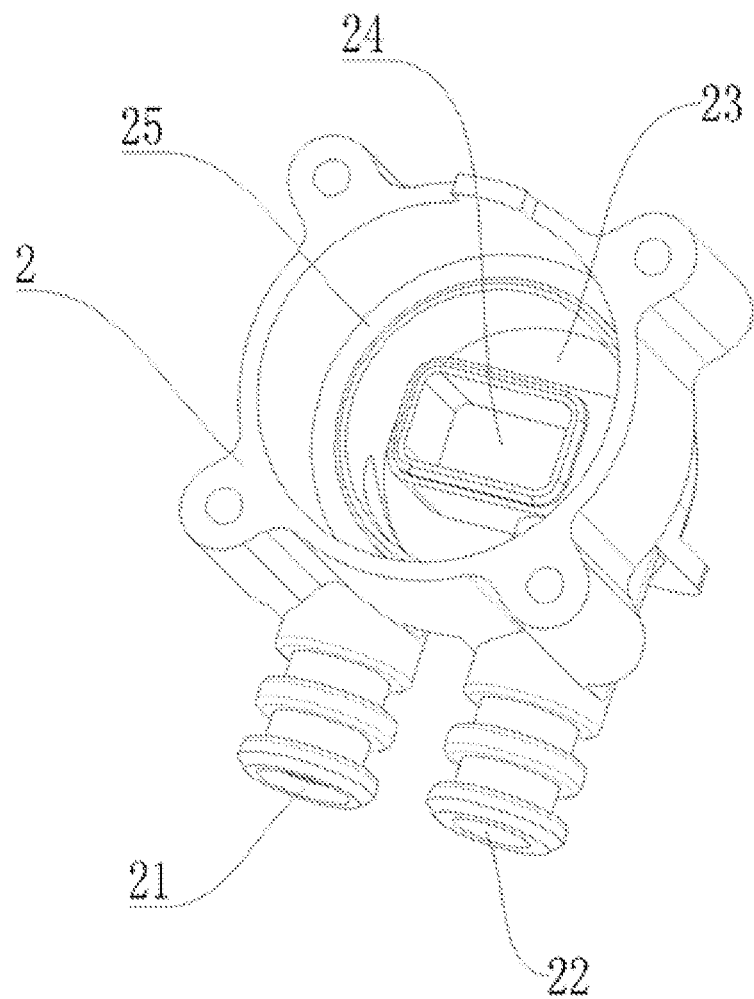
FIG. 8 is a structural schematic diagram of another angle of an outer base of the present disclosure.
Figure 9:
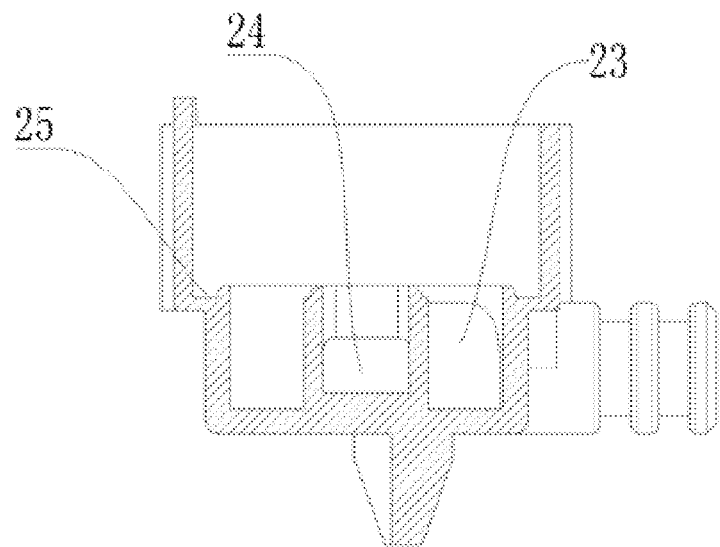
FIG. 9 is a structural schematic diagram of a section of a lower base of the present disclosure.

Specifically, as shown in FIG. 5 and FIG. 6, an upper partition 12 and a lower partition 13 are arranged in the outer shell 1, the upper partition 12 is located just above the lower partition 13, the coil assembly 6 is located between the upper partition 12 and the lower partition 13, the mounting base 32 is located above the upper partition 12, the cylinder 31 penetrates through the upper partition 12 and the lower partition 13, and the plug 33 is located below the lower partition 13. The upper partition 12 and the lower partition 13 are successively arranged from top to bottom and parallel to each other. A certain distance is between the upper partition 12 and the lower partition 13, and the coil assembly 6 is installed between the upper partition 12 and the lower partition 13. The cylinder 31 not only penetrates through the coil assembly 6, but also penetrates through the upper partition 12 and the lower partition 13, therefore hole positions, through which the cylinder 31 can pass, are arranged on the upper partition 12 and the lower partition 13. The upper end of the coil assembly 6 resists to the lower end face of the upper partition 12, the lower end of the coil assembly 6 resists to the upper end face of the lower partition 13, and the coil assembly 6 is fixed in the outer shell 1 through the upper partition 12 and the lower partition 13. The mounting base 32 is located above the upper partition 12, when the magnetic core 5 and the permanent magnet 4 attract each other, the mounting base 32 resists to the upper end face of the upper partition 12, and the plug 33 is located below the lower partition 13. Through such internal structure arrangement of the outer shell 1, the coil assembly 6 may be stably installed, and the upper partition 12 can also limit the movement of the fixed rack 3, so as to avoid great impact force of the plug 33 and the sealing silicon 7 on the cover plate.

As shown in FIG. 6, a slot position 121 that sinks upwards is arranged at the lower end face of the upper partition 12, and an upper edge of the magnetic core 5 is located outside the coil assembly 6 and located in the slot position 121. As mentioned above, the magnetic core 5 is a T-shaped structure, the main body of the magnetic core 5 is inserted into the coil assembly 6, and the upper edge of the magnetic core 5 extends outwards and is located above the coil assembly 6. The slot position 121, of which the shape matches with the upper edge of the magnetic core 5, is arranged at the lower end face of the upper partition 12, the upper edge of the magnetic core 5 is located in the slot position 121, and the upper end face of the coil assembly 6 resists to the lower end face of the upper partition 12. By arranging the slot position 121, the upper end face of the coil assembly 6 can resist to the lower end face of the upper partition 12, the compact structure among the coil assembly 6, the magnetic core 5, the upper partition 12 and the lower partition 13 can be improved, and the magnetic core 5 is closer to the permanent magnet 4, so as to ensure the magnetic attraction force and the repulsive force between the magnetic core 5 and the permanent magnet 4.

Figure 10:
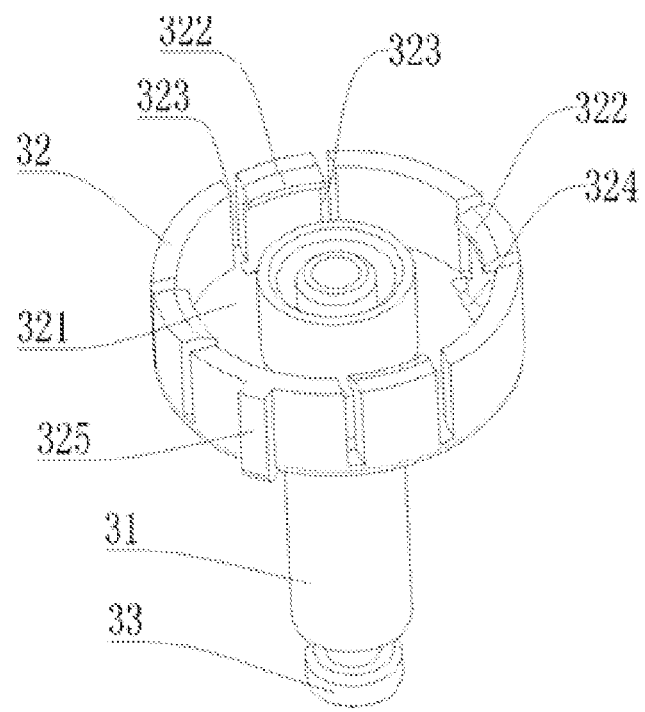
FIG. 10 is a structural schematic diagram of a fixed rack of the present disclosure.
Figure 12:
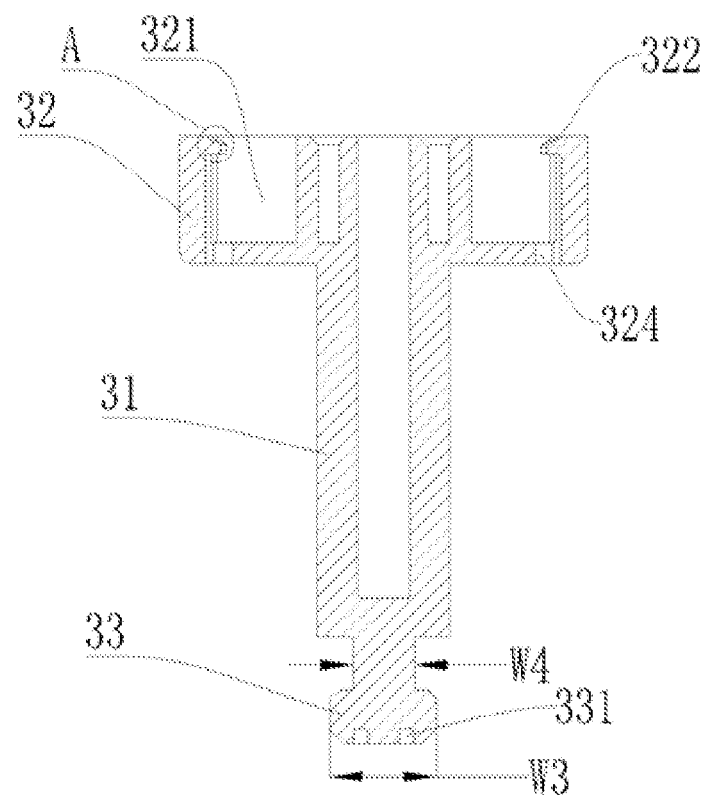
FIG. 12 is a structural schematic diagram of a section of a fixed rack of the present disclosure.
Figure 13:
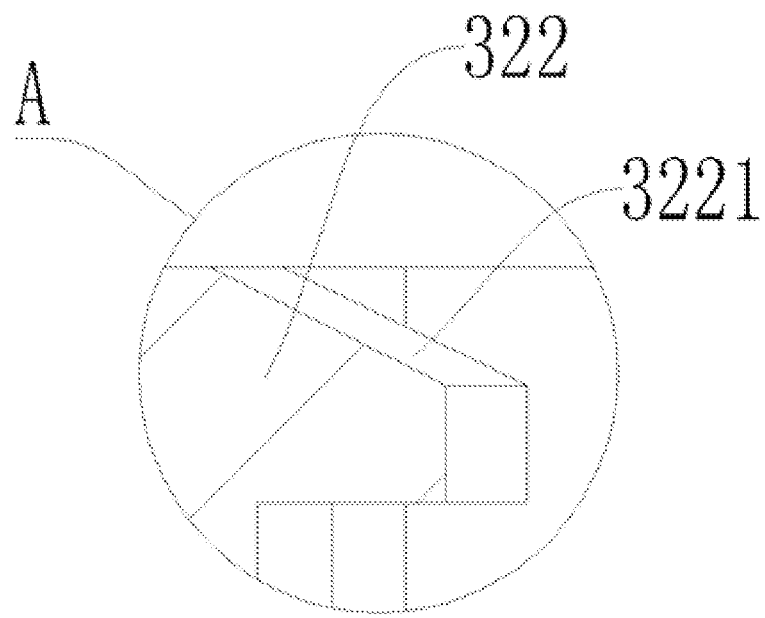
FIG. 13 is an amplified schematic diagram of a part A in FIG. 12.
Figure 14:
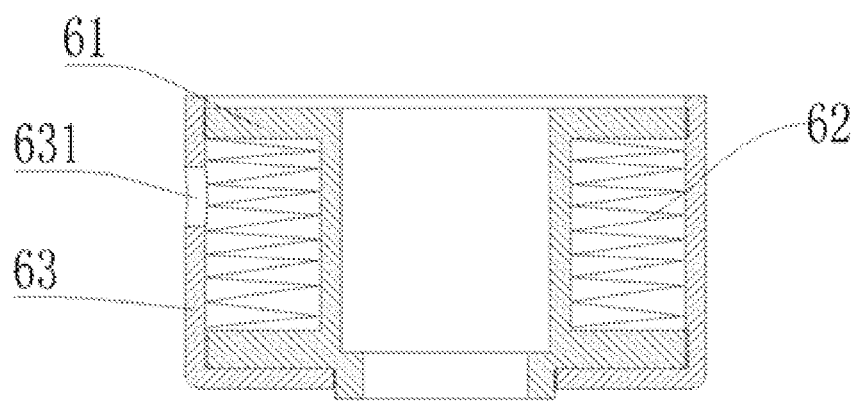
FIG. 14 is a structural schematic diagram of a section of a coil assembly of the present disclosure.
Figure 15:
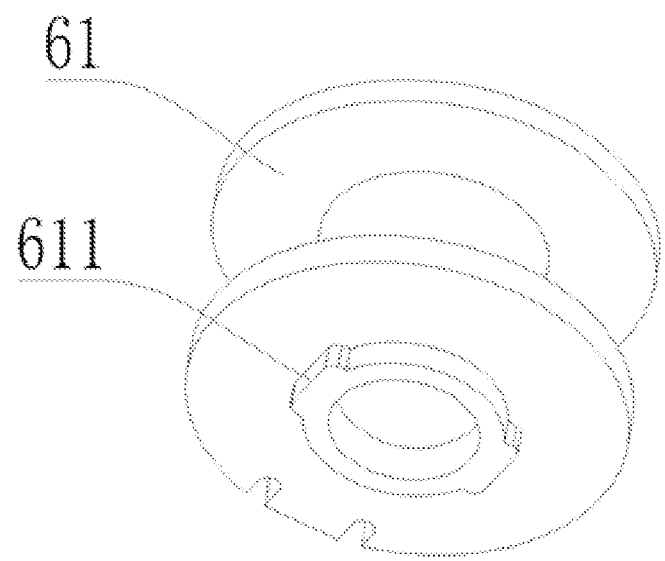
FIG. 15 is a structural schematic diagram of a skeleton of the present disclosure.
Figure 16:
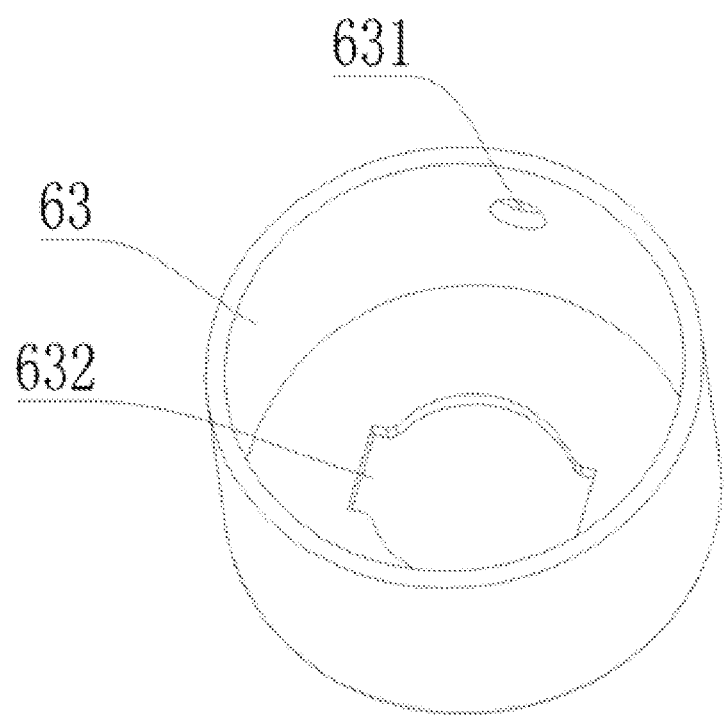
FIG. 16 is a structural schematic diagram of a shell of the present disclosure.

Further, as shown in FIG. 10, FIG. 12 and FIG. 13, a hook 322 is arranged at a side wall of the mounting base 32 to hook the permanent magnet 4, and two sides, at the hook 322, of the side wall of the mounting base 32, are provided with deformation grooves 323. A bottom surface of the accommodating chamber 321 is provided with a through groove 324 just below the hook 322.

The hook 322 towards the accommodating chamber 321 is arranged at the upper end of the side wall of the mounting base 32, and after the permanent magnet 4 is embedded into the accommodating chamber 321, the hook 322 resists to the upper end face of the permanent magnet 4, then hooks the permanent magnet 4. Specifically, a plurality of hooks 322 are uniformly distributed at intervals on the side wall of the mounting base 32 around the center of the mounting base 32. As shown in FIG. 5, four hooks 322 are provided. In an actual application, the quantity of the hook 322 may be two, three, five, etc. The two sides, at the hook 322, of the side wall of the mounting base 32, are provided with the deformation grooves 323. The role of the deformation grooves 323 is to generate certain hook 322 deformation when the permanent magnet 4 is inserted into the accommodating chamber 321, so as to install the permanent magnet 4 conveniently. After installation, the hook 322 can hook the permanent magnet 4 firmly to avoid hook 322 breakage. If the permanent magnet 4 is not further fixed by the hook 322 or other structures, the synchronization between the permanent magnet 4 and the fixed rack 3 will be worse. When the magnetic core 5 attracts or repels the permanent magnet 4, the fixed rack 3 cannot move synchronously in time, therefore the turn-on and turn-off actions of the electrically operated water valve are delayed, and the turn-on and turn-off effect is worse. If the synchronization between the fixed rack 3 and the permanent magnet 4 is worse, the force delivered between the fixed rack 3 and the permanent magnet 4 will be consumed.

The permanent magnet 4 is located in the accommodating chamber 321, so the permanent magnet 4 is separated from the magnetic core 5 by the bottom surface of the accommodating chamber 321. However, the through groove 324 is arranged on the bottom surface of the accommodating chamber 321, which can reduce the separation between the permanent magnet 4 and the magnetic core 5, so that the magnetic force between the permanent magnet 4 and the magnetic core 5 is greater (during mutual attraction or mutual repulsion, the force is greater), and the effect of turning on or turning off the electrically operated water valve is better. If the through groove 324 is not provided, the permanent magnet 4 is completely separated from the magnetic core 5 by the bottom surface of the accommodating chamber 321. The mutual attraction of the permanent magnet 4 and the magnetic core 5 may result in insufficient attraction and poor effect of blocking the water outlet hole 82. However, in order to improve the attraction, it needs to improve the material of the permanent magnet 4 and increase the manufacturing cost. The mutual repulsion of the permanent magnet 4 and the magnetic core 5 may result in less interaction force between the permanent magnet 4 and the magnetic core 5 and poor effect of opening the water outlet hole 82. In order to ensure the repulsive force, the quantity of the coil or the current needs to be increased, and then the using cost is also increased accordingly. Specifically, the through groove 324 is located just below the hook 322, at this time the design of the through groove 324 enables that the side wall of the mounting base 32 corresponding to the hook 322 has a greater deformability, so as to avoid the breakage of the permanent magnet 4 during the installation process well.

As shown in FIG. 12 and FIG. 13, in a direction that the permanent magnet 4 is embedded into the accommodating chamber 321, a guide inclined plane 3221 that extends gradually to the center of the mounting base 322 is arranged on the hook 322. The permanent magnet 4 is embedded into the accommodating chamber 321 from top to bottom, and the hook 322 extends to the accommodating chamber 321. When being installed, the permanent magnet 4 will extrude the hook 322, so that a deformation occurs to the side wall of the mounting base 32 and the hook 322 is offset outwards. After the installation of the permanent magnet 4 is completed, the hook 322 is reset due to the recovered deformation of the side wall of the mounting base, so as to hook the permanent magnet 4. The hook 322 is provided with the guide inclined plane 3221 that extends from top to bottom and from outside to inside, so that the side wall of the mounting base 32 deforms slowly when installing the permanent magnet 4, which is not only convenient for the installation of the permanent magnet 4, but also avoid the sudden change of the deformation degree of the side wall of the mounting base 32 at the hook 322, resulting in breakage.

Further, as shown in FIG. 5 and FIG. 10, a limiting strip 325, protruding outwards, is arranged on the side wall of the mounting base 32, a limiting groove 11 is arranged on an inner side wall of the outer shell 1, and the limiting strip 325 may be slidingly embedded into the limiting groove 11.

The length direction of the limiting strip 325 is consistent with the axial direction of the mounting base 32 and the activity direction of the fixed rack 3 and the permanent magnet 4. The limiting groove 11 may be formed when sinking in the inner side wall of the outer shell 1, or two parallel limiting columns spaced at a certain distance are arranged on the inner side wall of the outer shell 1, and the limiting groove 11 is formed between the two limiting columns. The limiting strip 325 is embedded into the limiting groove 11, and when the fixed rack 3 moves, the limiting strip 325 may slide in the limiting groove 11. The limiting strip 325 and the limiting groove 11 may play guiding and limiting roles to the movement of the fixed rack 3 and ensure that the fixed rack 3 moves only in a direction of turning on or turning off the electrically operated water valve, to avoid offset and ensure the turn-on/turn off effect. If the limiting strip 325 and the limiting groove 11 have no guiding and limiting roles to the movement of the fixed rack 3, the fixed rack 3 will generate the offset during the movement process, so the force delivery will have greater loss. The effect of turning on or turning off the electrically operated water valve is worse, and the parts may collide with each other, so the parts are easily damaged.

Further, as shown in FIG. 1-FIG. 4, an upper cover plate 9 is arranged at the upper end opening of the outer shell 1, the upper cover plate 9 is located just above the fixed rack 3, and a rubber stopper 10, which is used to limit the permanent magnet 4 to break away from the accommodating chamber 321, is arranged on the fixed rack 3.

Specifically, a buckle 14 for fixing the upper cover plate 9 is arranged at the upper end of the outer shell 1, a second neck 91 is arranged at the edge of the upper cover plate 9, and the buckle 14 is buckled in the second neck 91 so that the upper cover plate 9 is fixed at the upper end opening of the outer shell 1. The fixed rack 3 is located in the outer shell 1 and can move up and down in the outer shell 1, and the upper cover plate 9 is located just above the fixed rack 3. If the fixed rack 3 continues to move upwards, the cover plate can limit the fixed rack 3 to avoid the fixed rack 3 separating from the outer shell 1, resulting in loosening and falling of the parts. If the fixed rack 3 is not limited by the cover plate, when the current of the coil is great, the repulsive force between the magnetic core 5 and the permanent magnet 4 is great, so that the upper movement of the fixed rack 3 and the permanent magnet 4 exceeds the stroke. At this time, if the fixed rack 3 needs to be driven to move downwards, the greater distance between the permanent magnet 4 and the magnetic core 5 and the insufficient magnetic attraction force may cause to not close the water hole. Therefore, the upper cover plate 9 may ensure the normal turn-on or turn-off operation of the electrically operated water valve, and improve the structural integrity and closure.

A rubber stopper 10 is fixed on the fixed rack 3 and located above the permanent magnet 4. If the permanent magnet 4 is subjected to the repulsive force of the magnetic core 5, the permanent magnet 4 has a trend of separating from the accommodating chamber 321. At this time, if the permanent magnet 4 is not limited by the hook 322, the permanent magnet 4 will continue to move upwards so as to separate from the accommodating chamber 321, and at this time the rubber stopper 10 on the fixed rack 3 may play the role of limiting the permanent magnet 4, placing the permanent magnet 4 and separating from the accommodating chamber 321. The fixed rack 3 is located just above the upper cover plate 9, while the rubber stopper 10 is arranged on the fixed rack 3, so the upper cover plate 9 is similarly located just above the rubber stopper 10. When turning on the electrically operated water valve, the fixed rack 3 will be close to the upper cover plate 9, even impact the upper cover plate 9. However, the rubber stopper 10 is arranged on the fixed rack 3, when the fixed rack 3 impacts the upper cover plate 9, specifically the rubber stopper 10 directly contacts with the upper cover plate 9, the rubber stopper 10 is softer, so as to achieve the buffer action during impact and prevent the fixed rack 3 from impacting the upper cover plate 9 directly, resulting in damage and falling of the parts.

Further, as shown in FIG. 3 and FIG. 14-FIG. 16, the coil assembly 6 includes a skeleton 61, an electromagnetic coil 62 and a shell 63. The skeleton 61 is sleeved on the magnetic core 5, the electromagnetic coil 62 is wound on the skeleton 61 and electrically connected to an external power supply; and the shell 63 is installed on the skeleton 61 and arranged around outside of the electromagnetic coil 62. Through holes 631, through which the electromagnetic coil 62 can pass, are formed in the shell 63 and the outer shell 1. A locating bulge 611 is arranged on the skeleton 61, a locating groove 632 is formed in the shell 63, and the locating bulge 611 is buckled in the locating groove 632.

The skeleton 61 is an I-shaped structure, the electromagnetic coil 62 is wound on the skeleton 61, the middle of the skeleton 61 is hollow and the upper and lower ends are opened, and the magnetic core 5 is inserted into the hollow part in the middle of the skeleton 61. The shell 63 is a cylindrical structure with a hollow interior, an opened upper end and a tapped lower end face, and the skeleton 61 is arranged in the shell 63, which is arranged around the periphery of the electromagnetic coil 62. Therefore, the outer shell 1, the shell 63, the electromagnetic coil 62, the skeleton 61, the magnetic core 5 and the cylinder 31 are successively from outside to inside. The through holes 631 are formed at the relative positions of the outer shell 1 and the shell 63, and the electromagnetic coil 62 is electrically connected with the external power supply through the through holes 631. Specifically, a locating bulge 611 is arranged at the lower end face of the skeleton 61, a locating groove 632 is arranged at the lower end face of the shell 63, and when the skeleton 61 is installed in the shell 63, the locating bulge 611 is buckled in the locating groove 632. Such structure arrangement of the coil assembly 6 can be convenient for assembly, and the structure is simple.

Figure 18:
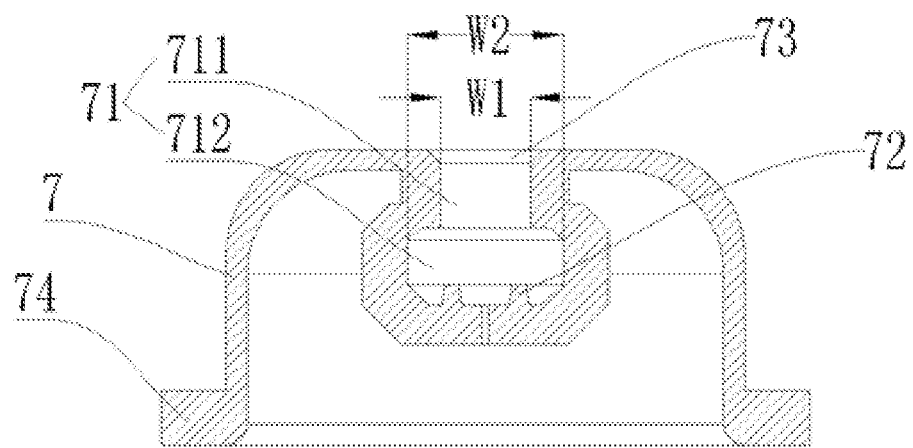
FIG. 18 is a structural schematic diagram of a section of sealing silicon of the present disclosure.

Further, as shown in FIG. 12 and FIG. 18, the accommodating groove 71 includes a tightening opening 711 and an accommodating slot 712 that are successively arranged up and down and mutually communicated. A width W1 of the tightening opening 711 is less than a width W2 of the accommodating slot 712, a width W3 of the plug 33 is greater than the width W1 of the tightening opening 711, and the plug 33 is embedded into the accommodating slot 712 through the tightening opening 711.

The accommodating groove 71 is composed of the tightening opening 711 and the accommodating slot 712 that are mutually communicated. The tightening opening 711 and the accommodating slot 712 are successively arranged along an embedding direction of the plug 33. The width W1 of the tightening opening 711 is less than the width W2 of the accommodating slot 712, the width W3 of the plug 33 is greater than the width W1 of the tightening opening 711, and the plug 33 is embedded into the accommodating slot 712 from top to bottom. When being inserted into the accommodating slot 712, the plug 33 passes through the tightening opening 711 first, the width W3 of the plug 33 is greater than the width W1 of the tightening opening 711, so during this process, the plug 33 will extrude the sealing silicon 7 and then a deformation (namely, expand the width of the tightening opening 711 in a short time) occurs to the sealing silicon 7, and after passing through the tightening opening 711, the plug 33 is finally located in the accommodating slot 712. The width W1 of the tightening opening 711 is less than the width W3 of the plug 33, so after being located in the accommodating slot 712, the plug 33 is not easy to break out of the accommodating slot 712 due to the limitation of the tightening opening 711, therefore the fixed rack 3 continuously moves up and down to keep the connection with the sealing silicon 7, so as to ensure no mutual falling, resulting in the sealing silicone 7 not blocking the water hole if necessary. If the sealing silicon 7 and the fixed rack 3 fall mutually, the fixed rack 3 will not enable the sealing silicon 7 to block the water hole during falling, and the sealing silicon 7 will deform irregularly, resulting in loosening and falling of the parts and failure to turn on and turn off the electrically operated water valve.

Figure 17:
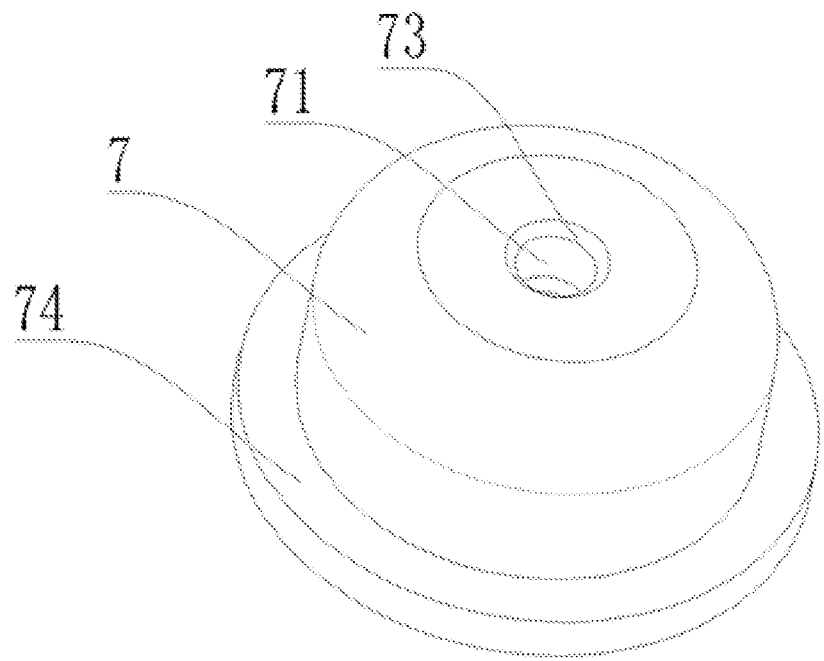
FIG. 17 is a structural schematic diagram of sealing silicon of the present disclosure.

As shown in FIG. 17 and FIG. 18, the guide inclined plane 73 is arranged at the upper end opening of the tightening opening 711, and the guide inclined plane 73 extends gradually and obliquely to the center of the tightening opening 711 from top to bottom. The plug 33 is embedded into the accommodating slot 712 from top to bottom, the guide inclined plane 73 that extends from top to bottom and from outside to inside is arranged at the opening of the tightening opening 711, so that the plug 33 enables the side wall of the tightening opening 711 to deform slowly during the embedding process, and a worker can embed the plug 33 into the accommodating slot 712 conveniently. Preferably, an inclined plane that matches with the guide inclined plane 73 is also arranged at the lower end of the plug 33, and the inclined angle and inclined direction of the inclined plane are the same as the guide inclined plane 73, so that the plug 33 is more convenient to assembly.

Further, as shown in FIG. 12 and FIG. 18, a width W4 of a joint of the plug 33 and the cylinder 31 is less than the width W1 of the tightening opening 711.

When the plug 33 is embedded into the accommodating slot 712, the sealing silicon 7 is extruded and the tightening opening 711 is enlarged first, and when the plug 33 is completely embedded into the accommodating slot 712, the joint of the plug 33 and the cylinder 31 is located in the tightening opening 711. The width W4 at the joint of the plug 33 and the cylinder 31 is less than the width W1 of the tightening opening 711, so that the deformation of the sealing silicon 7 can be recovered at the tightening opening 711 after the plug 33 is embedded into the accommodating slot 712, the width of the tightening opening 711 is changed to be normal, at this time the plug 33 can be well limited to be separated from the accommodating slot 712, the long-term deformation of the sealing silicon 7 at the tightening opening 711 can be avoided, resulting in deformation failure, and the tightening opening 711 cannot recover the initial size, resulting in easy falling of the plug 33 from the accommodating slot 712.

Figure 11:
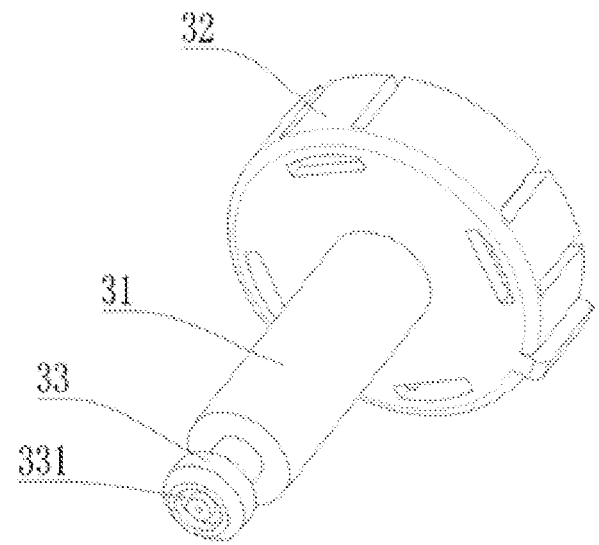
FIG. 11 is a structural schematic diagram of another angle of a fixed rack of the present disclosure.

Further, as shown in FIG. 11, FIG. 12 and FIG. 18, a ring groove 331 that sinks upwards is formed in the lower end face of the plug 33, a ring bulge 72 that raises upwards is arranged on the bottom surface of the accommodating slot 712, and the ring bulge 72 is embedded into the ring groove 331.

The whole plug 33 is a cylinder 31 structure, the ring groove 331 is arranged on the lower end face of the plug 33, and the center of the ring groove 331 is located on a central axis of the plug 33. The ring bulge 72 is arranged at the bottom of the accommodating slot 712, and the shape, position and size of the ring bulge 72 match with these of the ring groove 331. When the plug 33 is embedded into the accommodating slot 712, the ring bulge 72 is embedded into the ring groove 331. By arranging the ring bulge 72 and the ring groove 331, a worker can intuitively perceive whether the assembly is in place during assembly, and at the same time the plug 33 is more stably embedded into the accommodating slot 712.

Figure 19:
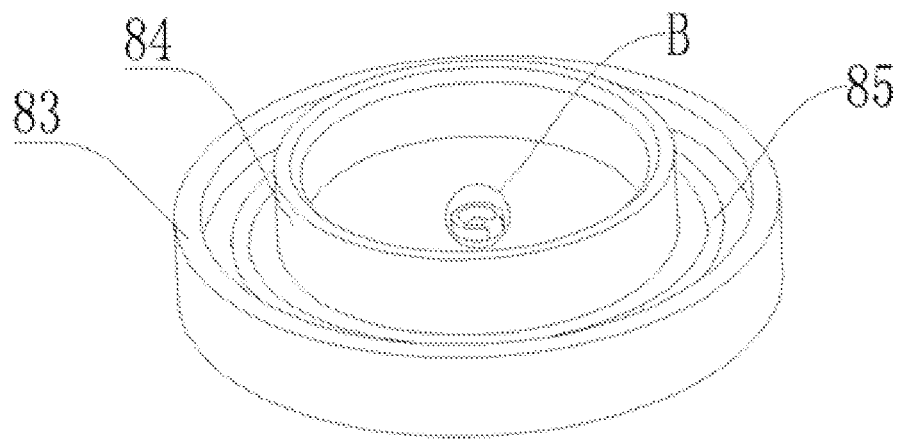
FIG. 19 is a structural schematic diagram of a lower cover plate of the present disclosure.
Figure 21:
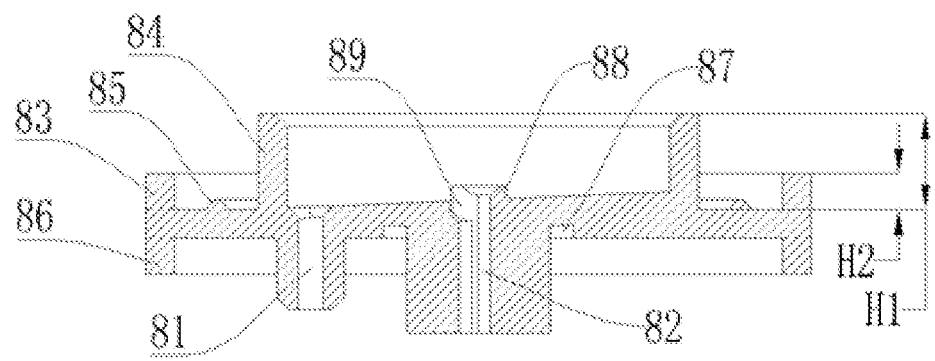
FIG. 21 is a structural schematic diagram of a section of a lower cover plate of the present disclosure.
Figure 22:
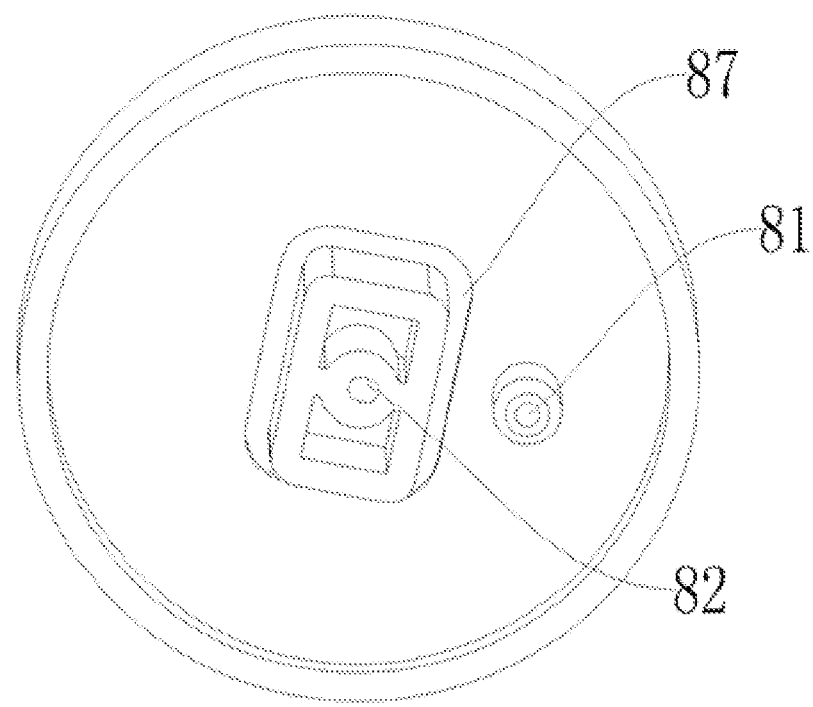
FIG. 22 is a structural schematic diagram of another angle of a lower cover plate of the present disclosure.
Figure 23:
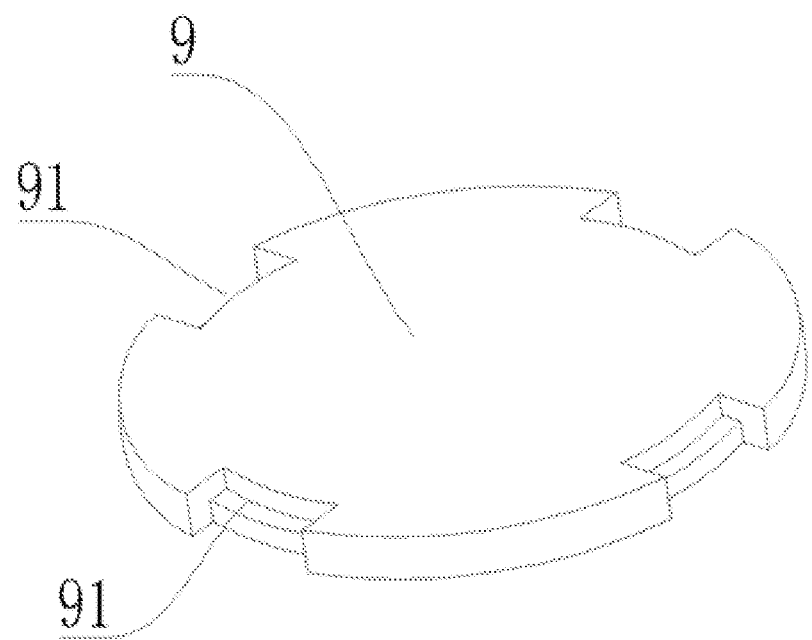
FIG. 23 is a structural schematic diagram of an upper cover plate of the present disclosure.

Further, as shown FIG. 19 and FIG. 21, the lower cover plate 8 is provided with an outer ring 83 and an inner ring 84, and the outer ring 83 is arranged around outside the inner ring 84. An outer edge 74 extending outwards is arranged at the lower end opening of the sealing silicon 7, the outer edge 74 is located between the outer ring 83 and the inner ring 84, an upper end face of the outer edge 74 resists to a lower end face of the outer shell 1, and a lower end face of the outer edge 74 resists to an upper end face of the lower cover plate 8. The lower end face of the outer shell 1 also resists to the upper end face of the outer ring 83, and an outer wall of the inner ring 84 resists to an inner wall of the sealing silicon 7.

The whole sealing silicon 7 is a reversed bowl-shaped structure, and the interior of the sealing silicon 7 is hollow and the lower end is opened. An area is formed between the sealing silicon 7 and the lower cover plate 8, and the water will enter this area when flowing. The lower cover plate 8 is located at the lower end opening of the outer shell 1, the outer edge 74 is located between the outer shell 1 and the lower cover plate 8, and the outer edge 74 is clamped by the lower end face of the outer shell 1 and the upper end face of the lower cover plate 8. Such structural arrangement of the sealing silicon 7 may further ensure that the water can be separated from the metal parts of the electrically operated water valve by the sealing silicon 7. The lower cover plate 8 is a disk-shaped structure, the upper end face of the lower cover plate 8 is provided with the outer ring 83 raised upwards and the inner ring 84, the centers of the outer ring 83 and the inner ring 84 are the centers of the lower cover plate 8, and the outer ring 83 is located outside the inner ring 84 (namely, one side away from the center). A certain gap is between the outer ring 83 and the inner ring 84. The lower cover plate 8 is arranged at the lower end opening of the shell 1, the lower end of the outer shell 1 resists to the upper end face of the outer ring 83, the side wall of the sealing silicon 7 is located between the outer ring 83 and the inner ring 84, specifically the inner wall of the sealing silicon 7 is close to the outer wall of the inner ring 84, and the outer edge 74 is located between the inner ring 84 and the outer ring 83. According to the structural arrangement of the lower cover plate 8, assembly structures of the lower cover plate 8 and the sealing silicon 7 are compact, more importantly, avoid water in the sealing silicon 7 outflowing between the outer shell 1 and the sealing silicon 7 (namely, outside the sealing silicon 7), resulting in rust of the metal components in the electrically operated water valve when the electrically operated water valve is used.

The lower cover plate 8 is provided with a convex circle 85 raised upwards between the outer ring 83 and the inner ring 84. The outer edge 74 is located between the inner ring 84 and the outer ring 83, and the lower end face of the outer edge 74 resists to the upper end face of the cover plate. The sealing silicon 7 is made of soft silicon, with a certain elastic deformability. The lower cover plate 8 is provided with the convex circle 85 between the outer ring 83 and the inner ring 84. When resisting to the upper end face of the lower cover plate 8, the lower end face of the outer ring 83 resists to the convex circle 85. The lower cover plate 8 and the outer shell 1 may clamp the outer edge 74 tightly by arranging the convex circle 85, so as to improve the stability of the whole structure and avoid easy loosening of the sealing silicon 7, meanwhile the frictional force between the sealing silicon 7 and the cover plate may be increased, so as to avoid the random rotation of the sealing silicon 7 during usage.

Further, as shown in FIG. 21, the height H1 of the inner ring 84 is greater than the height H2 of the outer ring 83. The inner ring 84 is located in the sealing silicon 7 and resists to the inner wall of the sealing silicon 7, the water outlet hole 82 is formed in the middle of the lower cover plate 8 (the sealing silicon 7 needs to seal the water outlet hole 82, so the water outlet hole 82 is necessarily located on the lower cover plate 8 covered by the sealing silicon 7, and then the water inlet hole 81 is similarly located on the lower cover plate 8 covered by the sealing silicon 7), so the height H1 of the inner ring 84 is designed to be higher, then the water in the sealing silicon 7 is not easy to flow out of the gap between the sealing silicon 7 and the inner ring 84, in order to further ensure the airtightness and prevent the rust of the metal parts in the electrically operated water valve.

Figure 24:
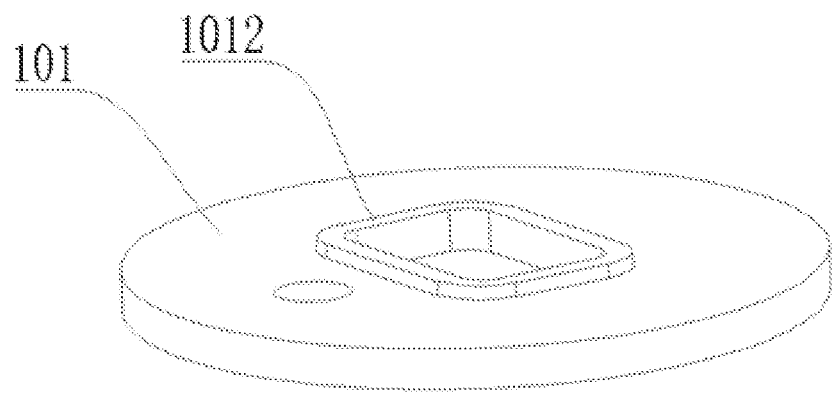
FIG. 24 is a structural schematic diagram of a rubber mat of the present disclosure.
Figure 25:
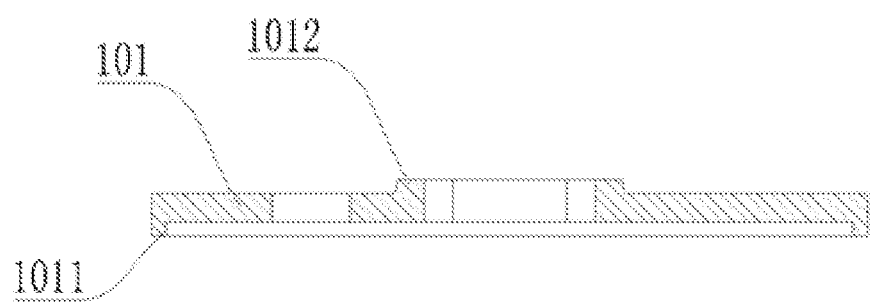
FIG. 25 is a structural schematic diagram of a section of a rubber mat of the present disclosure.

Further, as shown in FIG. 21, FIG. 24 and FIG. 25, further including a rubber mat 101 arranged below the lower cover plate 8, and a first convex ring 1011 is arranged at the edge of the lower end face of the rubber mat 101. A second convex ring 86 is arranged at the edge of the lower end face of the lower cover plate 8, a first neck 25 opened upwards is arranged on the inner side wall of the lower base 2, and the first convex ring 1011 and the second convex ring 86 are inserted into the first neck 25.

A water inlet chamber 23 and a water outlet chamber 24 are arranged on the lower base 2, the water inlet chamber 23 is separated from the water outlet chamber 24 by the side wall in the lower base 2, the lower cover plate 8 is arranged just above the water inlet chamber 23 and the water outlet chamber 24 so as to cover the water inlet chamber 23 and the water outlet chamber 24 and seal the water inlet chamber 23 and the water outlet chamber 24. The water can only flow into the cavity between the sealing silicon 7 and the lower cover plate 8 from the water inlet chamber 23 through the water inlet hole 81, and then enters into the water outlet chamber 24 through the water outlet hole 82, and thus the water flow can be cut off and the electrically operated water valve can be turned off when blocking the water outlet hole 82. Therefore, the lower cover plate 8 needs to be covered just above the water inlet chamber 23 and the water outlet chamber 24 and resists to the side wall separating the water inlet chamber 23 from the water outlet chamber 24. The rubber mat 101 is arranged below the lower cover plate 8, the upper end face of the rubber mat 101 is closed to the lower end face of the lower cover plate 8, and the lower end face of the rubber mat 101 resists to the side wall separating the water inlet chamber 23 from the water outlet chamber 24. The lower base 2 may be tightly closed to the lower cove plate 8 by arranging the rubber mat 101, so as to prevent the water from flowing between the water inlet chamber 23 and the water outlet chamber 24 through the gap between the lower cover plate 8 and the lower base 2, resulting in incapable cut-off and control of the water. Specifically, the first neck 25 with an upward opening is arranged on the side wall of the lower base 2, the first neck 25 is a ring neck surrounding the side wall of the lower base 2, the second convex ring 86 extending downwards is arranged at the edge of the lower end face of the lower cover plate 8, the rubber mat 101 is located in the area enclosed by the second convex ring 86, the edge of the rubber mat 101 and the first convex ring 1011 resist to the inner side wall of the second convex ring 86, and the first convex ring 1011 and the second convex ring 86 are inserted into the first neck 25 at the same time. Such arrangement may further improve the connecting stability among the lower cover plate 8, the rubber mat 101 and the lower base 2. A side wall, closing to the middle of the lower base 2, of the first neck 25 resists to the rubber mat 101, which can further prevent the water from circulating between the water inlet chamber 23 and the water outlet chamber 24 through the gap between the lower cover plate 8 and the lower base 2.

Further, as shown in FIG. 21, FIG. 22, FIG. 24 and FIG. 25, a third convex ring 1012 that raises upwards is arranged on the upper end face of the rubber mat 101, a ring groove 87 that sinks upwards is formed in the lower end face of the lower cover plate 8, and the third convex ring 1012 is buckled in the ring groove 87.

The third convex ring 1012 is arranged at the position where the upper end face of the rubber mat 101 is closed to the center, the ring groove 87 is arranged at the position where the lower end face of the lower cover plate 8 is closed to the center, and the shape and the size of the ring groove 87 match with those of the third convex ring 1012, which is buckled in the ring groove 87. Through such arrangement, the assembly of the rubber mat 101 and the lower cover plate 8 is convenient, and the rubber mat 101 is closer to the lower cover plate 8.

Figure 20:
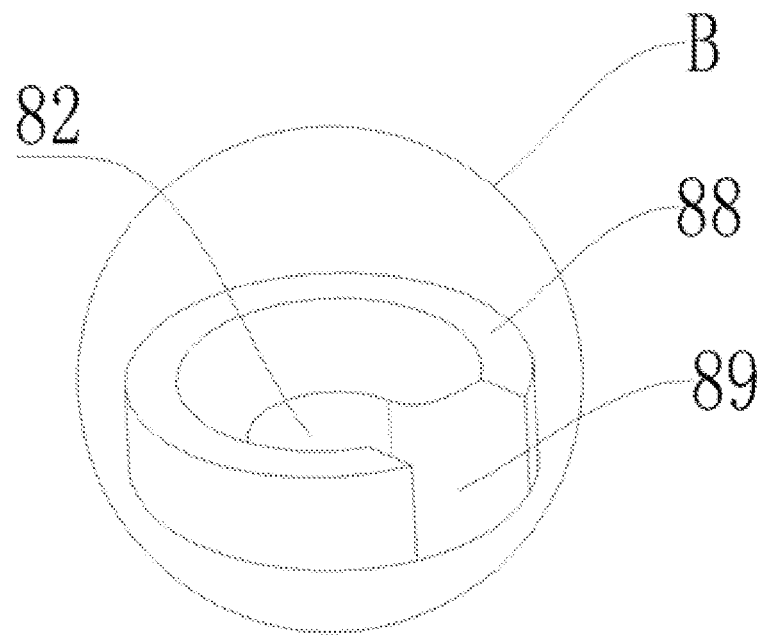
FIG. 20 is an amplified schematic diagram of a part B in FIG. 19.

Further, as shown in FIG. 19-FIG. 21, when moving up and down, the fixed rack 3 can drive the sealing silicon 7 to open or close the water outlet hole 82, the lower cover plate 8 is provided with a fourth convex ring 88 that raises upwards at the water outlet hole 82, and a notch 89 that is mutually communicated with the water outlet hole 82 is arranged on the fourth convex ring 88.

The electrically operated water valve is also used as a waste water valve, and the water valve must ensure that the water flows all the time, so the existing waste water valve is directly provided with a waste water outlet 22 at other positions (such as the side or the side bottom) of the lower cover plate 8, and the structure is more complicated, and not convenient to clean and dredge the waste water outlet 22. However, in this embodiment, cutting off the water flow specifically blocks the water outlet hole 82, so the fourth convex ring 88 is arranged at the water outlet hole 82, and then the notch 89 is arranged on the fourth convex ring 88. When the plug 33 and the sealing silicon 7 need to block the water outlet hole 82, the sealing silicon 7 resists to the upper end of the fourth convex ring 88, at this time the notch 89 at the side of the fourth convex ring 88 is not blocked, so the space in the sealing silicon 7 is always communicated with the water outlet hole 82 mutually through the notch 89, the water outlet hole 82 is used as the waste water outlet 22, so the demand that the waste water valve needs to keep water flowing is achieved. Compared with the waste water outlet 22 separately arranged at other positions of the lower cover plate 8, the structure of the lower cover plate 8 provided by this embodiment is simpler. When cleaning and dredging the water outlet hole 82, indicating to clean and dredge the waste water outlet 22, therefore, the waste water outlet 22 is more convenient to clean and dredge.

Figure 3:
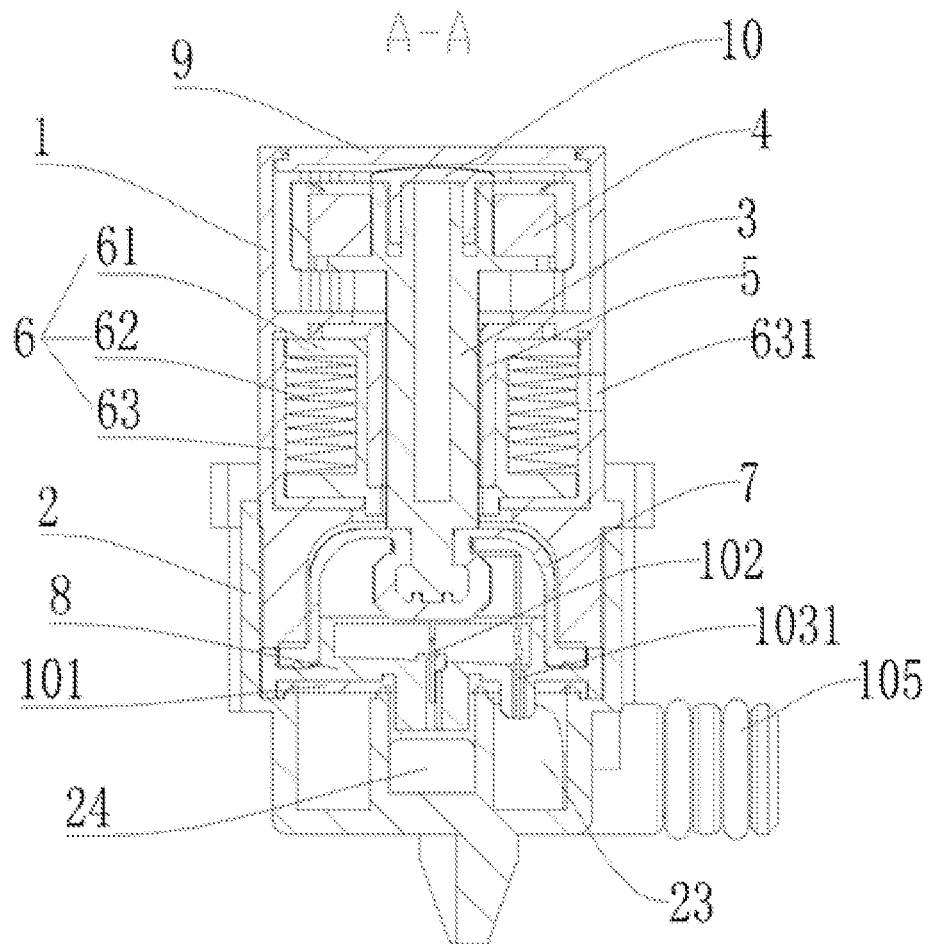
FIG. 3 is a structural schematic diagram of an A-A section of an electrically operated water valve in FIG. 2.
Figure 4:
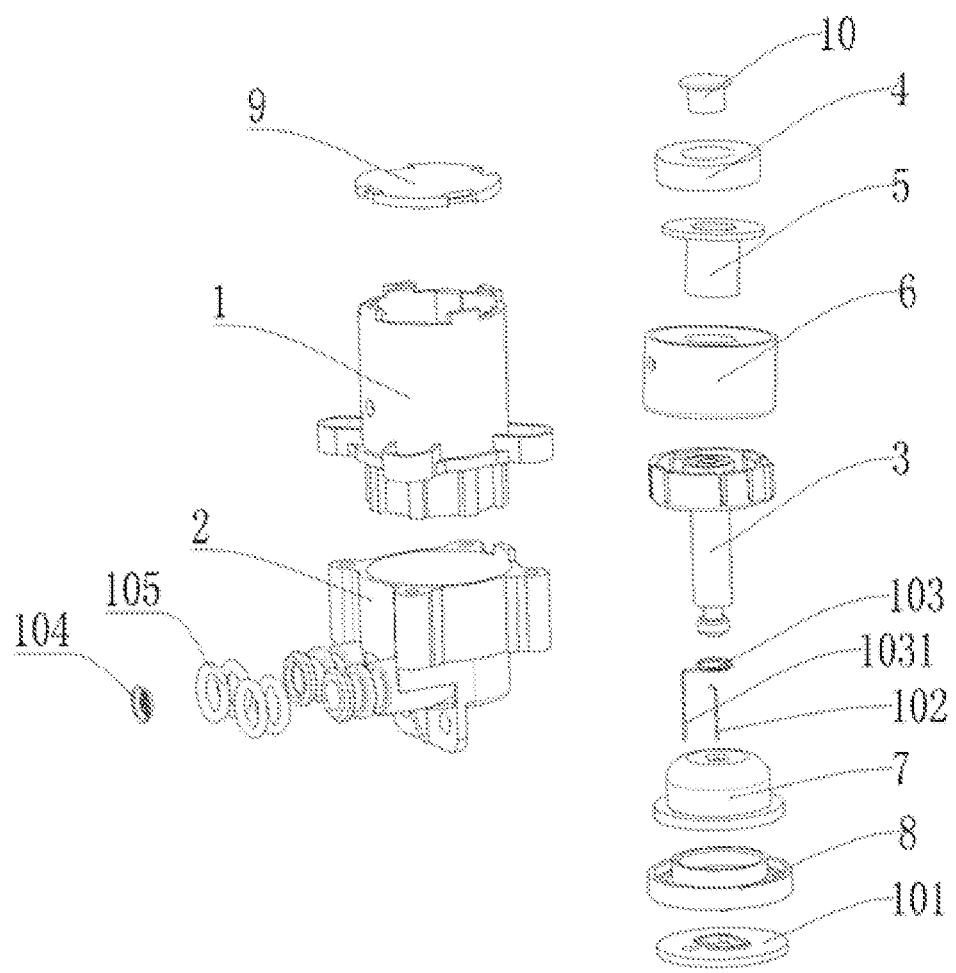
FIG. 4 is a schematic diagram of an explosion structure of an electrically operated water valve of the present disclosure.

Further, as shown in FIG. 3 and FIG. 4, a first pin 102 is arranged on the plug 33, passes through the sealing silicon 7, is inserted into the water outlet hole 82, and moves axially in relative to the water outlet hole 82.

The water outlet hole 82 has a smaller hole diameter. To prevent the impurities in the water from blocking the water outlet hole 82 during usage, the first pin 102 is threaded in the water outlet hole 82. The first pin 102 is specifically fixed on the plug 33 and stretches into the water outlet hole 82 by the sealing silicon 7. The plug 33 ascends or descends to drive the first pin 102 to move along the axial direction of the water outlet hole 82, so as to clean and dredge the water outlet hole 82. When turning on or turning off the electrically operated water valve, the automatic cleaning and dredging of the water outlet hole 82 may be achieved by arranging the first pin 102, instead of cleaning and dredging the water outlet hole 82 separately, and the service life is longer.

Further, as shown in FIG. 3 and FIG. 4, the spring 103 is sleeved on the side wall of the tightening opening 711 and located in the sealing silicon 7, and one end of the spring 103 is bended to form the second pin 1031, which can be inserted into the water inlet hole 81 and moves axially in relative to the water inlet hole 81.

Similarly, the water inlet hole 81 has a smaller hole diameter, in order to prevent the impurities in the water from blocking the water inlet hole 81, the second pin 1031 is threaded in the water inlet hole 81. The spring 103 is sleeved on the side wall of the tightening opening 711, and one end of the spring 103 is bended downwards to form the second pin 1031, which is inserted into the water inlet hole 81. The plug 33 is inserted into the accommodating slot 712 of the sealing silicon 7, and the plug 33 ascends or descends to drive the second pin 1031 to move along the axial direction of the water inlet hole 81, so as to clean and dredge the water inlet hole 81. As mentioned above, the tightening opening 711 has a smaller width, so when the spring 103 is sleeved on the side wall of the tightening opening 711, the side wall of the accommodating slot 712 may further limit the spring 103 to prevent the spring 103 from falling.

The first pin 102 and the second pin 1031 are respectively inserted into the water outlet hole 82 and the water inlet hole 81. If an offset occurs to the plug 33 and the sealing silicon 7, the hole walls of the water outlet hole 82 and the water inlet hole 81 will respectively extrude the first pin 102 and the second pin 1031, finally the first pin 102 and the second pin 1031 are bended, resulting in incapable cleaning and dredging of the water outlet hole 82 and the water inlet hole 81. The above limiting strip 325 and the limiting groove 11 can be used to guide and limit the movement of the fixed rack 3, so that the first pin 102 and the second pin 1031 only move along the axial directions of the water outlet hole 82 and the water inlet hole 81 respectively, so as to avoid bending the first pin 102 and the second pin 1031, and ensure the cleaning and dredging effect of the water outlet hole 82 and the water inlet hole 81.

Figure 2:
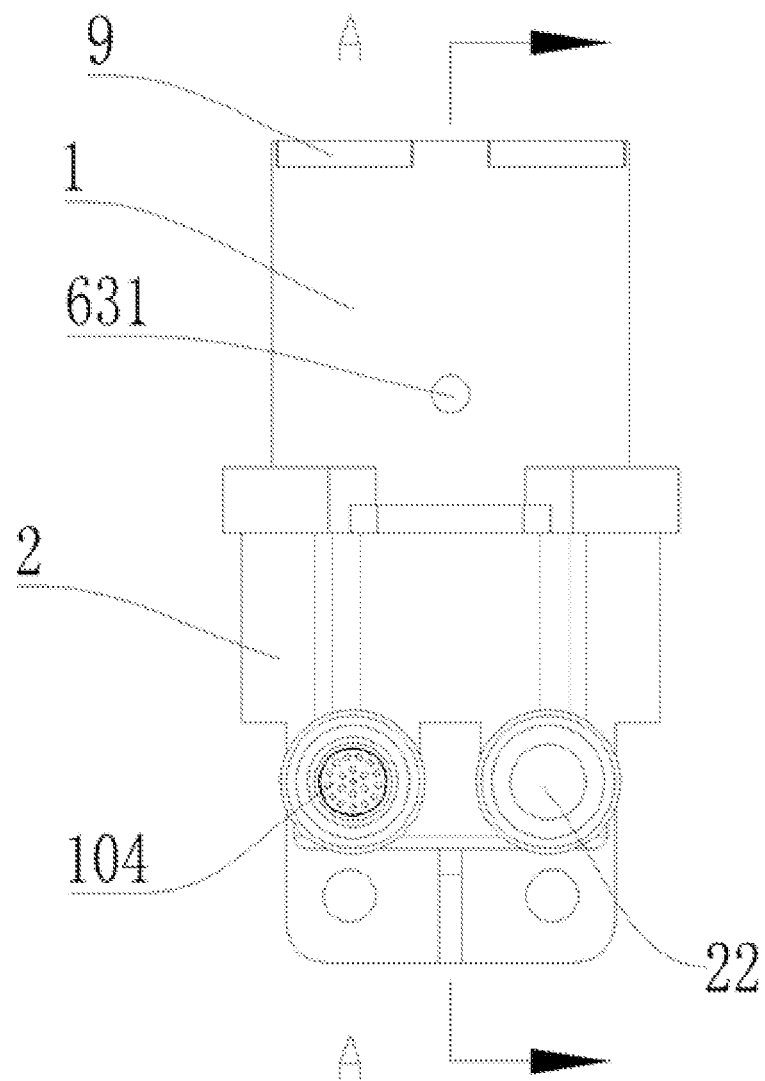
FIG. 2 is a schematic diagram of a front structure of an electrically operated water valve of the present disclosure.

As shown in FIG. 1, FIG. 2 and FIG. 4, a filter screen 104 is arranged in the water inlet 21, the filter screen 104 is made of stainless steel, the impurities in the water in the electrically operated water valve can be filtered by the filter screen 104, and the impurities will block the water inlet 21, the water inlet hole 81, the water outlet hole 82 and the water outlet 22.

As shown in FIG. 1, the water inlet 21 and the water outlet 22 can extend outwards, so that the electrically operated water valve is conveniently installed on an electric appliance needing to control the water flow. Silicone gaskets 105 are sleeved outside the side walls of the water inlet 21 and the water outlet 22, so that the water inlet 21 and the water outlet 22 are closely installed with the electric appliance, to avoid water leakage.

On the other hand, the present disclosure further provides an application of the electrically operated water valve on the electric appliance. For the application of the electrically operated water valve on the electric appliance, the electric appliance is any one of a water purifier, a purified water dispenser, a water dispenser, a floor scrubber, a sweeper, a clothes steamer, a dust collector, a washing machine and a dish-washing machine. The electrically operated water valve needs to be used in many electric appliances, so the above electrically operated water valve may be applied in the electric appliance field needing to control the water flow, such as a water purifier, a purified water dispenser, a water dispenser, a floor scrubber, a sweeper, a clothes steamer, a dust collector, a washing machine and a dish-washing machine, with a wide application range and above beneficial effects.

The above is the preferred embodiment of the present disclosure, instead of limiting the patent scope of the present disclosure. Without departing from the concept of the present disclosure, the equal structural transformations made according to the contents of the specification and the drawings or direct/indirect application in other related technical fields fall within the scope of protection of the present disclosure.

The invention claimed is:

1. An electrically operated water valve, comprising an outer shell (1), a lower base (2), a fixed rack (3), a permanent magnet (4), a magnetic core (5), a coil assembly (6), sealing silicon (7) and a lower cover plate (8);
wherein the coil assembly (6) is arranged in the outer shell (1) and sleeved on the magnetic core (5), wherein the permanent magnet (4) is installed on the fixed rack (3) capable of being movably arranged on the magnetic core (5);
wherein the lower base (2) is installed at a lower end of the outer shell (1) and provided with a water inlet (21) and a water outlet (22), where the lower cover plate (8) is located in the lower base (2) near a lower end opening of the outer shell (1), and wherein the lower cover plate (8) is provided with a water inlet hole (81) and a water outlet hole (82);
wherein the sealing silicon (7) is arranged at a lower end of the fixed rack (3) and located just above the water inlet hole (81) and the water outlet hole (82), wherein a water inlet chamber (23) and a water outlet chamber (24) are arranged in the lower base (2), wherein the water inlet chamber (23) is connected to the water inlet (21) and the water inlet hole (81), and wherein the water outlet chamber (24) is connected to the water outlet (22) and the water outlet hole (82); and
wherein the magnetic core (5) and the permanent magnet (4) repel or attract each other to cause the fixed rack (3) to ascend or descend, and wherein the sealing silicon (7) is driven to open or close the water inlet hole (81) or the water outlet hole (82) by the fixed rack(3).

2. The electrically operated water valve according to claim 1, wherein the fixed rack (3) further comprising a cylinder (31) and a mounting base (32) arranged at one end of the cylinder (31), and a plug (33) is arranged at another end of the cylinder, away from the mounting base (32); wherein an accommodating chamber (321) is arranged on the mounting base (32), and the permanent magnet (4) is installed in the accommodating chamber (321); wherein an upper end face of the sealing silicon (7) sinks downwards to form an accommodating groove (71), and the plug (33) is inserted into the accommodating groove (71); and wherein the cylinder (31) penetrates through the magnetic core (5) so that the permanent magnet (4) and the plug (33) are respectively located above and below the magnetic core (5).

3. The electrically operated water valve according to claim 2, wherein a hook (322) is arranged on a side wall of the mounting base (32), wherein a deformation groove (323) is provided on each side of the hoot and the mounting base; and wherein a bottom surface of the accommodating chamber (321) is provided with a through groove (324) just below the hook (322).

4. The electrically operated water valve according to claim 2, wherein a limiting strip (325), protruding outwards, is arranged on a side wall of the mounting base (32), wherein a limiting groove (11) is arranged on an inner side wall of the outer shell (1), and wherein the limiting strip (325) is capable of being slidingly embedded into the limiting groove (11).

5. The electrically operated water valve according to claim 2, wherein an upper cover plate (9) is arranged at an upper end opening of the outer shell (1), wherein the upper cover plate (9) is located just above the fixed rack (3), and wherein a rubber stopper (10), capable of limiting the permanent magnet (4) to break away from the accommodating chamber (321), is arranged on the fixed rack (3).

6. The electrically operated water valve according to claim 2, wherein a first pin (102) is arranged on the plug (33), passes through the sealing silicon (7), is inserted into the water outlet hole (82), and moves axially in relative to the water outlet hole (82).

7. The electrically operated water valve according to claim 2, wherein the accommodating groove (71) further comprising a tightening opening (711) and an accommodating slot (712) that are successively arranged up and down and mutually communicated, wherein a width of the tightening opening (711) is less than a width of the accommodating slot (712), a width of the plug (33) is greater than the width of the tightening opening (711), and the plug (33) is embedded into the accommodating slot (712) through the tightening opening (711).

8. The electrically operated water valve according to claim 7, wherein a width of a joint of the plug (33) and the cylinder (31) is less than the width of the tightening opening (711).

9. The electrically operated water valve according to claim 7, wherein a ring groove (331) wards is formed in a lower end face of the plug (33), wherein a ring bulge (72) is arranged on a bottom surface of the accommodating slot (712), and wherein the ring bulge (72) is embedded into the ring groove (331).

10. The electrically operated water valve according to claim 7, wherein a spring (103) is sleeved on a side wall of the tightening opening (711), wherein the spring (103) is located in the sealing silicon (7), wherein one end of the spring (103) is bended to form a second pin (1031), and wherein the second pin (1031) is inserted into the water inlet hole (81) and moves axially in relative to the water inlet hole (81).

11. The electrically operated water valve according to claim 1, wherein the coil assembly (6) further comprising a skeleton (61), an electromagnetic coil (62) and a shell (63), wherein the skeleton (61) is sleeved on the magnetic core (5), wherein the electromagnetic coil (62) is wound on the skeleton (61) and electrically connected to an external power supply, and wherein the shell (63) is installed on the skeleton (61) and arranged around outside of the electromagnetic coil (62); wherein through holes (631) are formed in the shell (63) and the outer shell (1); and wherein a locating bulge (611) is arranged on the skeleton (61), wherein a locating groove (632) is formed in the shell (63), and wherein the locating bulge (611) is buckled in the locating groove (632).

12. The electrically operated water valve according to claim 1, wherein the lower cover plate (8) is provided with an outer ring (83) and an inner ring (84), and wherein the outer ring (83) is arranged around outside the inner ring (84); wherein an outer edge (74) extending outwards is arranged at a lower end opening of the sealing silicon (7), wherein the outer edge (74) is located between the outer ring (83) and the inner ring (84), wherein an upper end face of the outer edge (74) is adjacent to a lower end face of the outer shell (1), and wherein a lower end face of the outer edge (74) adjacent to an upper end face of the lower cover plate (8); and the lower end face of the outer shell (1) also adjacent to the upper end face of the outer ring (83), and wherein an outer wall of the inner ring (84) adjacent to an inner wall of the sealing silicon (7).

13. The electrically operated water valve according to claim 10, wherein a height of the inner ring (84) is greater than a height of the outer ring (83).

14. The electrically operated water valve according to claim 10, wherein the electrically operated water valve further comprising a rubber mat (101) arranged below the lower cover plate (8), and wherein a first convex ring (1011) is arranged at an edge of a lower end face of the rubber mat (101); wherein a second convex ring (86) is arranged at an edge of a lower end face of the lower cover plate (8), wherein a first neck (25) with an upward opening is arranged on an inner side wall of the lower base (2), and wherein the first convex ring (1011) and the second convex ring (86) are inserted into the first neck (25).

15. The electrically operated water valve according to claim 12, wherein a third convex ring (1012) is arranged on the upper end face of the rubber mat (101), wherein a ring groove (87) is formed in the lower end face of the lower cover plate (8), and wherein the third convex ring (1012) is buckled in the ring groove (87).

16. The electrically operated water valve according to claim 1, wherein when moving up and down, the fixed rack (3) is capable of driving the sealing silicon (7) to open or close the water outlet hole (82); and wherein the lower cover plate (8) is provided with a fourth convex ring (88) at the water outlet hole (82), and the fourth convex ring (88) is provided with a notch (89), which is connected to the water outlet hole (82).

* * * * *